(12) United States Patent
Cho et al.

(10) Patent No.: US 6,463,100 B1
(45) Date of Patent: Oct. 8, 2002

(54) ADAPTIVE QUANTIZATION CONTROL METHOD

(75) Inventors: Sanghee Cho, Seoul; Heesub Lee, Kyungki-do; Kyoungwon Lim; Cheol-Hong Min, both of Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/221,981

(22) Filed: Dec. 29, 1998

(30) Foreign Application Priority Data

Dec. 31, 1997 (KR) .............................. 97/81039

(51) Int. Cl.⁷ ................................. H04N 7/12
(52) U.S. Cl. ..................... 375/240.03; 375/240.05; 375/240.27
(58) Field of Search ............ 375/240.03, 240.05, 375/240.27, 240.29; 382/251, 239, 248, 252, 266, 268, 269, 275; 348/425.2, 607, 606, 620, 625

(56) References Cited

U.S. PATENT DOCUMENTS

| | | | | | |
|---|---|---|---|---|---|
| 5,592,302 A | * | 1/1997 | Hirabayashi | ................. | 358/433 |
| 5,654,759 A | * | 8/1997 | Augenbraun et al. | ........ | 348/405 |
| 5,691,775 A | * | 11/1997 | Astle | ........................... | 348/416 |
| 5,909,249 A | * | 6/1999 | Sathe et al. | .................. | 348/403 |
| 5,946,652 A | * | 8/1999 | Heddle | ........................ | 704/230 |
| 6,037,985 A | * | 3/2000 | Wong | ......................... | 348/405 |
| 6,049,629 A | * | 4/2000 | Hirabayashi | ................. | 382/239 |

OTHER PUBLICATIONS

Minami, Shigenobu et al., "An Optimization Approach for Removing Blocking Effects in Transform Coding", IEEE Transactions on Circuits and Systems for Video Technology, vol. 5, No. 2, Apr. 1995, pp. 74–81.

* cited by examiner

*Primary Examiner*—Vu Le
(74) *Attorney, Agent, or Firm*—Fleshner & Kim, LLP

(57) ABSTRACT

A method and apparatus for an adaptive quantization control is disclosed. The present invention decomposes one picture into a plurality of blocks, encodes the picture in the block unit and controls quantization by obtaining a first activity from a comparison of the activity of the current block to be encoded and that of the entire blocks; obtaining a second activity from a comparison of motions of neighboring blocks; and controlling the quantization using the first activity if the first activity is below a reference value and using the second activity if the first activity exceeds the reference value.

28 Claims, 32 Drawing Sheets origin signal (x(k))

predicted signal (p(k))

predicted error signal (e(k))

Quantised e(k) signal (e'(k))

Reconstructed signal (x'(k))

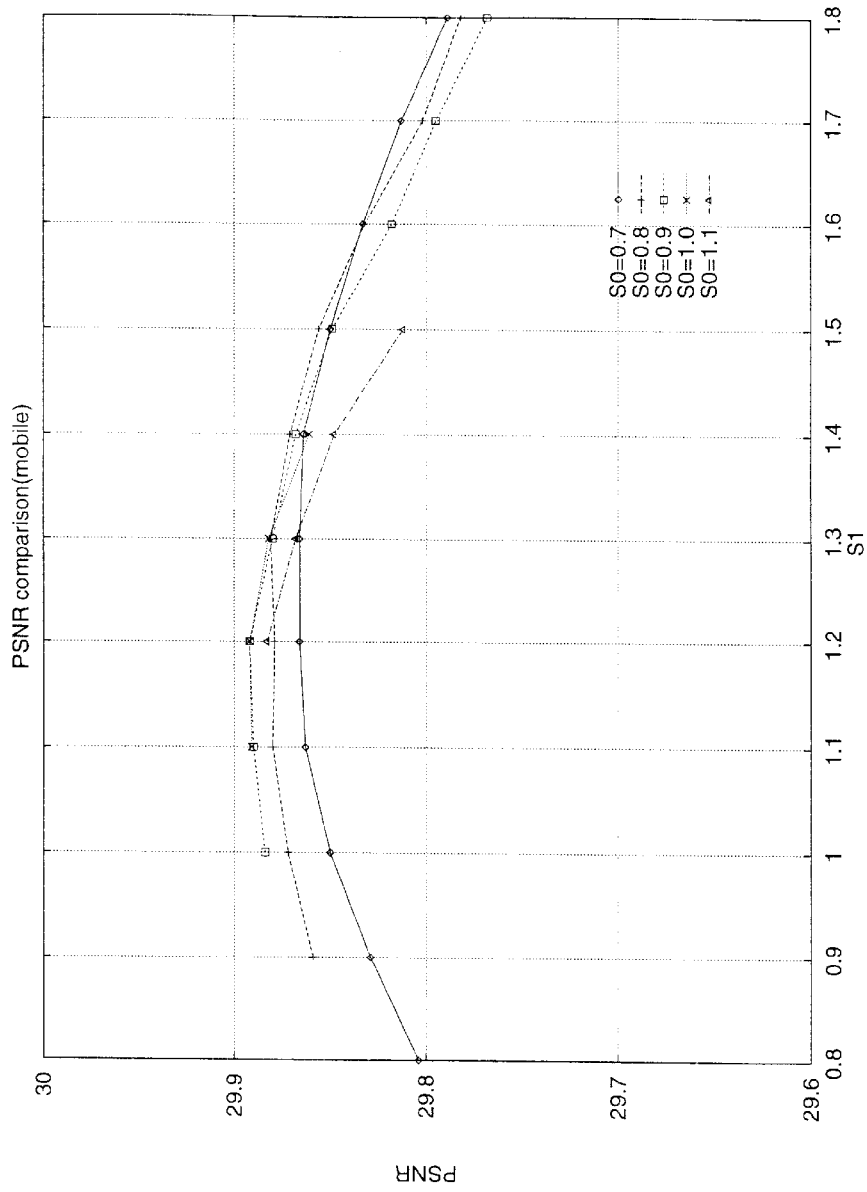

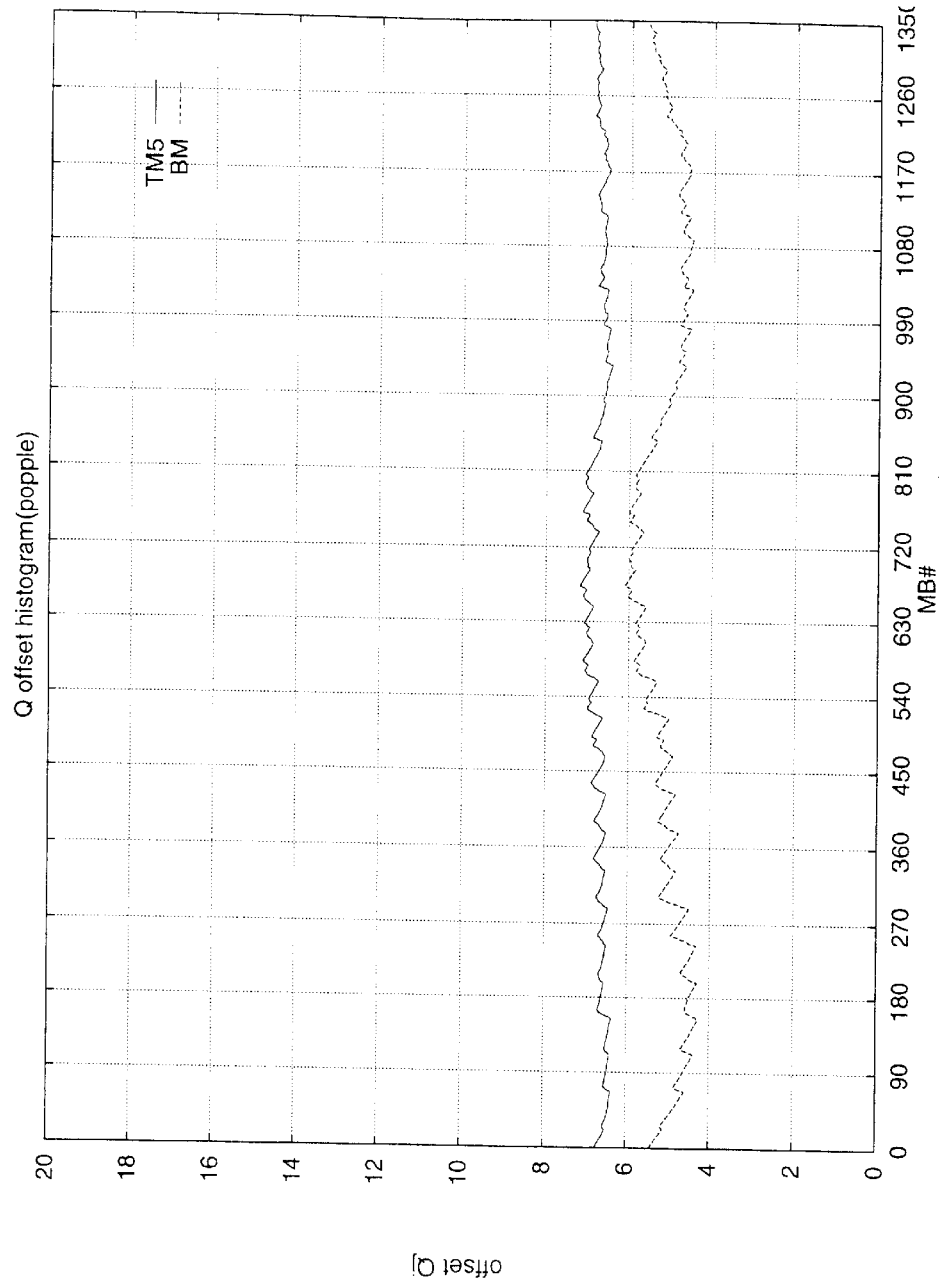

ADAPTIVE QUANTIZATION CONTROL METHOD

BACKGROUND OF INVENTION

1. Field of the Invention

The present invention relates to a video encoder, and more particularly to a method for controlling the quantization. The present invention proposes a method of performing an adaptive quantization control in consideration of the characteristic of the input picture and the capacity of buffer in an MPEG2 encoder.

2. Background of the Related Art

Generally, digital TV provides a superior picture quality on the TV receiver for the viewers. As a result, a growing interest in digital TV broadcasting has cultivated many efforts to compress video data for transmission and reproduction. Typically, a moving picture expert group (MPEG2) is used as the algorithm to compress video signals. Having a high compression rate ranging from approximately 1/40 to 1/60, the MPEG2 algorithm enables digital data transmission of high quality through general broadcasting channels to entertain viewers at home. The MPEG encoder classifies a picture into an Intra (I) frame, a Predictive (P) frame or a Bidirectional (B) frame and a decoder decodes the picture based on the type of the frame. Each frame is also divided into macro block (MB) units constituted by 16×16 pixels.

For purpose of the following illustration, some terms will first be defined as follows. The parameter for quantization of DCT coefficients in a MB is called a "quantizer_scale", the parameter determined by the buffer in a bit rate control of TM5 (the name of a test model used in establishment of MPEG2 standards) is called an "offset $Q_j$", and the parameter obtained by multiplying the offset $Q_j$ with an activity measure in a macro block is called a quantization parameter "mquant$_j$".

The quantization parameter is clipped as an integer ranging from 1 to 31 and is sent to a decoder as a 5-bit header information. The quantizer scale for quantizing the DCT coefficients is substantially determined by a q_scale_type function at the MPEG2. In particular, the relationship quantizer_scale=g(mquant$_j$) is satisfied and a function g(·) is determined by the q_scale_type. There are two types of q_scale_type in the MPEG2. If the q_scale_type is '0', g(·) falls on a linear function, otherwise if q_scale_type is '1', g(·) is a non-linear function.

A method for performing a bit rate control proposed in the MPEG2 TM5 will be described briefly. FIG. 1 is a block diagram of a video encoder in the background art comprising an image memory 101 storing the original image in units of field or frame; a subtractor 102 obtaining a residual signal between the original image and a reconstructed image; and a DCT section 103 performing a DCT conversion of the residual signal. The value obtained by the DCT conversion is quantized at a quantizer 104 and the quantized signal is inverse-quantized at a inverse quantizer 105 prior to an inverse DCT (IDCT) conversion through an IDCT section 106. The IDCT converted signal is added to a motion-compensated signal at an adder 107 and stored in a memory 108. The video data stored in the memory 108 is subjected to motion estimation and compensation at a motion estimation/compensation (E/C) section 109 and sent to the subtractor 102 and the adder 107.

A complexity calculator 110 calculates the spatial activity of the image stored in the image memory 101. The spatial activity is generally a measure of the picture complexity or level detail of a macro block and will be further explained below. An encoder controller 111 is the bit rate controller and controls the quantization rate of the quantizer 104 in consideration of the calculated spatial activity and the capacity of a buffer 115. The VLC 112 variable length codes the quantized data and the motion vector (MV) coding section codes the motion vector from the motion E/C section 109. The VLC encoded data and the encoded MV are input to the buffer 115 and are transmitted to a decoder in the form of a bit stream data.

Particularly, the quantization is coarse for high spatial activity and less coarse for lower spatial activity. Thus, the spatial activity is utilized to control the bit rate control for quantization. Also, a defined bit rate is allocated to a group of pictures (GOP) according to a transfer bit rate and the bits are allocated to each picture according to the complexity of each picture I, P, and B. The global complexity X of each picture is given by Equation 1 below, $$X_i = S_i Q_i, X_p = S_p Q_p, X_b = S_b Q_b \qquad \text{[Equation 1]}$$

where $S_i$, $S_p$ and $S_b$ are bits generated after the previous I, P and B pictures are encoded, and $Q_i$, $Q_p$ and $Q_b$ are averages of the quantization parameters mquant$_j$ used in all macro blocks.

The complexity of the previous picture I, P, and B is used to obtain the bit allocation for the current picture of the same type and can be expressed by Equation 2 below.

$$T_i = \max\left\{\frac{R}{1 + \frac{N_p X_p}{X_i K_p} + \frac{N_b X_b}{X_i K_b}}, \frac{\text{bit\_rate}}{8 \times \text{picture\_rate}}\right\} \qquad \text{[Equation 2]}$$

$$T_p = \max\left\{\frac{R}{N_p + \frac{N_b K_p X_b}{X_p K_b}}, \frac{\text{bit\_rate}}{8 \times \text{picture\_rate}}\right\}$$

$$T_b = \max\left\{\frac{R}{N_b + \frac{N_p K_b X_p}{X_b K_p}}, \frac{\text{bit\_rate}}{8 \times \text{picture\_rate}}\right\}$$

In Equation 2, $K_p$ and $K_b$ are constants depending on the quantization matrix, typically having values 1.0 and 1.4 in the TM5, respectively. R is the number of bits remaining after encoding the previous picture bits allocated to the GOP. The bit-rate is a channel transfer rate (bits/sec) and the picture-rate is the number of pictures decoded per second.

The value of R is adjusted when the bits are allocated to the pictures in the next GOP as in Equation 3, $$R \leftarrow G + R \qquad \text{[Equation 3]}$$

where G=bit_rate×N/image_rate and N is the size of GOP. $N_p$ and $N_b$ are the numbers of P and B images to be encoded within the current GOP.

The bit rate is controlled to encode the current picture at a rate adequate for the number of bits allocated, which is dependant upon the complexity in a picture. Also, assuming that an virtual buffer is assigned to each picture, the quantization parameters are regulated according to the state of the buffer. The state of each buffer may be expressed by Equation 4 before macro block j is encoded.

$$d^i_j = d^i_0 + B_{j-1} - \{T_i \times (j-1)\}/\text{MB\_cnt}$$

$$d^p_j = d^p_0 + B_{j-1} - \{T_p \times (j-1)\}/\text{MB\_cnt}$$

$$d^b_j = d^b_0 + B_{j-1} - \{T_b \times (j-1)\}/\text{MB\_cnt} \qquad \text{[Equation 4]}$$

The values $d^i_0$, $d^p_0$ and $d^b_0$ are the initial buffer values, which are actually the bit rate control difference of a picture from a previous picture of the same type. In other words, the initial buffer values are the differences between the number of bits allocated in coding the picture and the number of bits generated in coding a previous picture of the same type. MB_cnt is the total number of macro blocks for the image.

An offset $Q_j$ of the jth macro block is calculated by the following expression using the status information of the buffer when coding the (j−1)th macro block, $$Q_j = \{31 \times d\}/r \quad \text{[Equation 5]}$$

where r=2×bit_rate/picture_rate.

Adaptive quantization is a method of changing the offset $Q_j$ according to the complexity of the current macro block used to enhance the subjective quality of the picture. Particularly, $Q_j$ is multiplied by a factor N_$act_j$ utilizing an $act_j$ value indicating the complexity of macro blocks. The factor N_$act_j$ may be expressed by Equation 6 below, $$N\_act_j = \frac{2 \times act_j + avg\_act}{act_j + 2 \times avg\_act} \quad \text{[Equation 6]}$$

where $act_j$ represents the minimum of the variances in the subblocks of the macro block. In Equation 6, the $act_j$ is smaller than the average complexity of a current picture for portions sensitive to the human's sight and accordingly the N_$act_j$ factor is also small. However, the N_$act_j$ factor is large for complex portion less sensitive to the sight because $act_j$ is larger than the average complexity. The quantization parameter mquant$_j$ is calculated by Equation 7 and is clipped as an integer ranging from 1 to 31.

$$mquant_j = Q_j \times N\_act_j \quad \text{[Equation 7]}$$

The quantization control in video encoding significantly affects the quality of image. However, the MPEG standard controls quantization using only the variance of macro blocks of the current image, and does not have effective measures to reduce blocking effects or to minimize the number of bits by taking into consideration the characteristic of the picture.

Noise in a recovered image is an inevitable problem which occurs during a lossy coding of the moving picture data. The blocking effect is the most significant noise appearing in the recovered image. Specifically, a visible discontinuities at the edges between macro blocks caused during the block coding is known as the blocking effect. Because coding of blocks is performed independently, the correlation between the edges of adjacent blocks are not taken into consideration by the MPEG standard method. As a result, discontinuities across block boundaries of recovered image occurs and would be noticeable as noise.

The extent of blocking effect is dependant upon the type of coded pictures. In an I picture, for example, blocking effect is not significantly visible because the DC coefficients DCT-converted are separately encoded precisely according to the DC in consideration of the significance of the DC coefficients. Actually, 720×480 sequences of the original image are coded at a bit rate of 6 Mbits/sec and decoded such that almost no blocking effect is shown in the I frame.

The blocking effect chiefy appears in the P or B pictures, particularly in an area where motion compensation is not accurately achieved. Referring to FIGS. 2(a) to (e), a blocking effect is shown in the block boundaries of the reconstruced frame as shown in part (e) when the error signal is coarsely quantized. This phenomena especially occurs in the boundary of objects making large motion. For an object with large motion, the spatial activity would also be high around the boundary of the object, resulting in a coarse quantization of such portion. As a result, the residual signals for compensating the error of the prediction frame almost disappear, such that the blocking effect in the prediction frame still appears as shown in FIG. 2(b).

The original image may be accurately recovered from the prediction information if the motion compensation is well achieved, and although there may be significant damage on the residual information, the recovered image will have little blocking effect. Thus, problems may occur when the quantization of the error signal is controlled by considering only the spatial activity in the current original image as in the MPEG2 TM5 without considering the motion.

Moreover, the blocking effect is not visible to the naked eye in the recovered image at areas which is too dark or bright. It is therefore efficient to quantize this portion more coarsely and use the saved bits from this portion for other portion. However, the MPEG TM5 also does not take the above effect into consideration, and performs quantization regardless whether the image area is dark or bright.

SUMMARY OF THE INVENTION

Accordingly, an object of the present invention is to solve at least the problems and disadvantages of the related art.

An object of the present invention is to provide an adaptive quantization control method with improved image quality.

Another object of the present invention is to provide an efficient bit rate control for the quantization.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an adaptive quantization decomposes one image into a plurality of macro blocks; encodes the image in block unit and controls quantization by using the complexity of the blocks. The adaptive quantization includes obtaining a spatial activity by comparing the complexity of the current block to be encoded to the entire blocks; obtaining a slope activity by comparing the degree of motion in the current block to the entire block; and controlling the quantization by using the spatial activity if the spatial activity is below a reference value and using the slope activity if the spatial activity exceeds the reference value.

FIG. 3 is a diagram comparing the TM5 method to the present invention, in which the portion above the horizontal line shows the TM5 method and the portion below the horizontal line shows the present invention method. The vertical line indicates the different levels of spatial activity in the TM5. Particularly, if the spatial activity is below the threshold S0, the TM5 method would be adequate. However, if the spatial activity is higher than the threshold value S0, a slope activity is additionally utilized for a more precise quantization. The slope activity is used to search and determine an area where blocking effect may appear. Accordingly, the inventive concept of the present invention is perform fine quantization of a macro block having high possibility of blocking effect at the block boundary. The slope activity will be described below.

Moreover, according to the present invention, within the portion determined to be quantized finely using the slope activity, a texture region in which blocking effect would not visibly appear to the naked eye is extracted. This texture region is quantized coarsely because a precise quantization is not necessary. Furthermore, after a reduction of the blocking effect, the portion too bright or dark is quantized coarsely in consideration of the luminance masking effect.

Therefore, as shown in FIG. 3, if the spatial activity is below a first threshold S0, the TM5 method is directly used to control quantization. If the spatial activity is between the threshold values S0 and S1, spatial activity and slope activity are taken into consideration to control quantization. If the spatial activity is above the threshold value S1, the slope activity and texture extraction are taken into consideration to control quantization. After these considerations, the brightness masking is further taken into consideration to control the quantization.

BRIEF DESCRIPTION OF THE DRAWINGS

The invention will be described in detail with reference to the following drawings in which like reference numerals refer to like elements wherein:

FIGS. 10(a) to (f) are graphs showing a weighting parameter;

FIGS. 17(a) to (c) show a decreasing offset $Q_j$ due to buffer accumulation in the present invention compared with TM5.

DETAILED DESCRIPTION OF THE PREFERRED EMBODIMENT

Reference will now be made in detail to the preferred embodiments of the present invention, examples of which are illustrated in the accompanying drawings. For purposes of explanation, the data obtained from the following experiment uses a 4:2:0 format as 720×480 ccir image. The bit rate, if not specifically limited, is 6 Mbits/sec and the size of the GOP is 15 having a structure of {I B B P B B P . . . }. Thus, the GOP size N is 15 and the distance M between the reference frames is 3.

Figure 1:
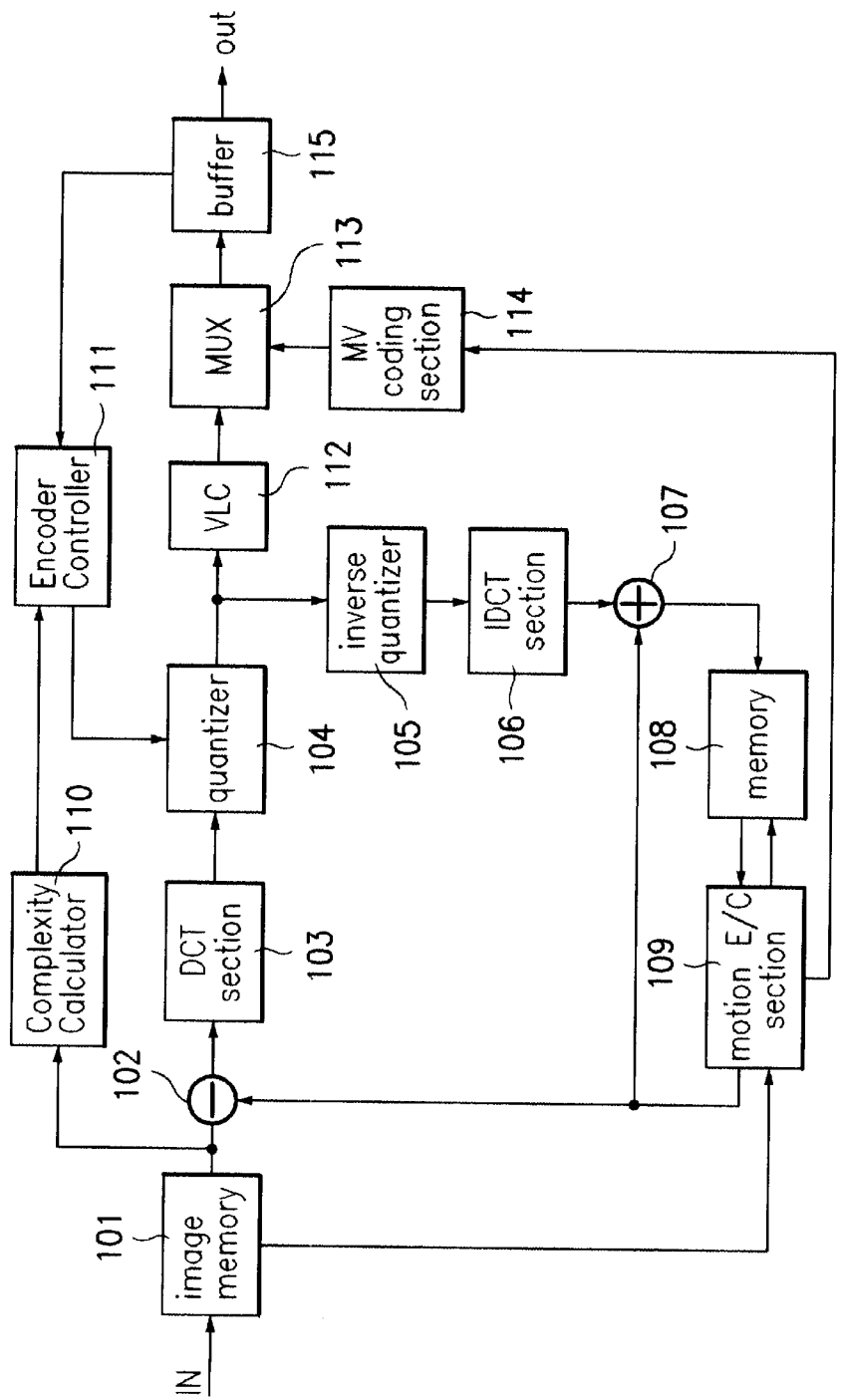
FIG. 1 is a block diagram of a general video encoder in the related art.
Figure 2A:
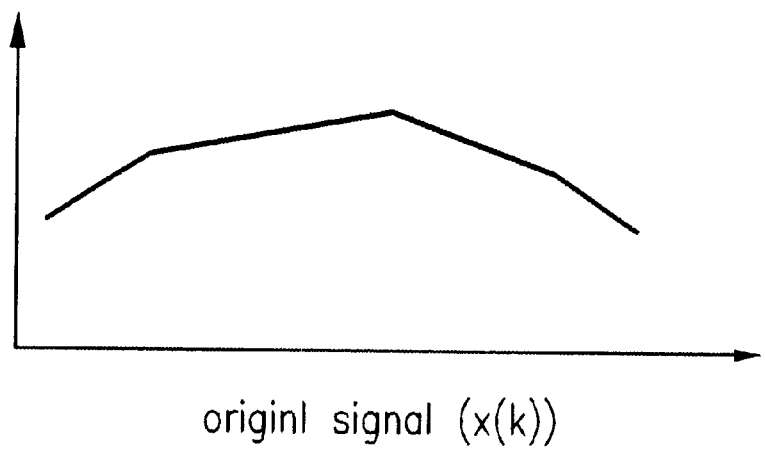
FIGS. 2(a) to (e) are graphs for explaining the blocking artifact.
Figure 2B:
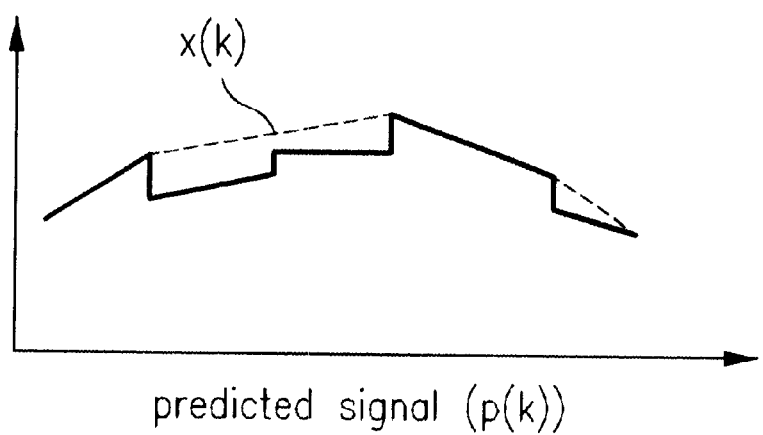
Figure 2C:
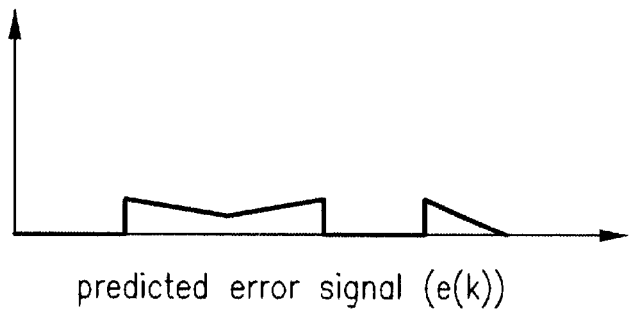
Figure 2D:
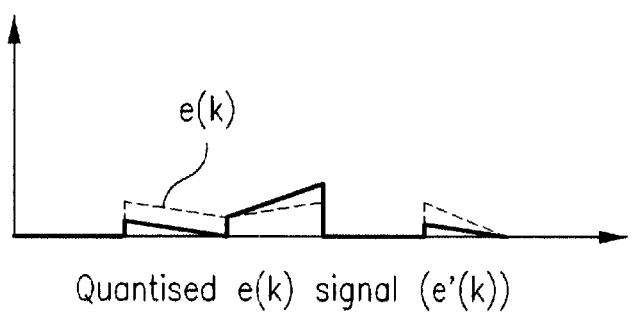
Figure 2E:
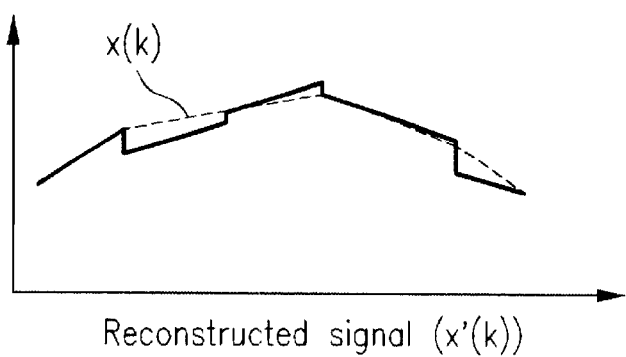
Figure 4:
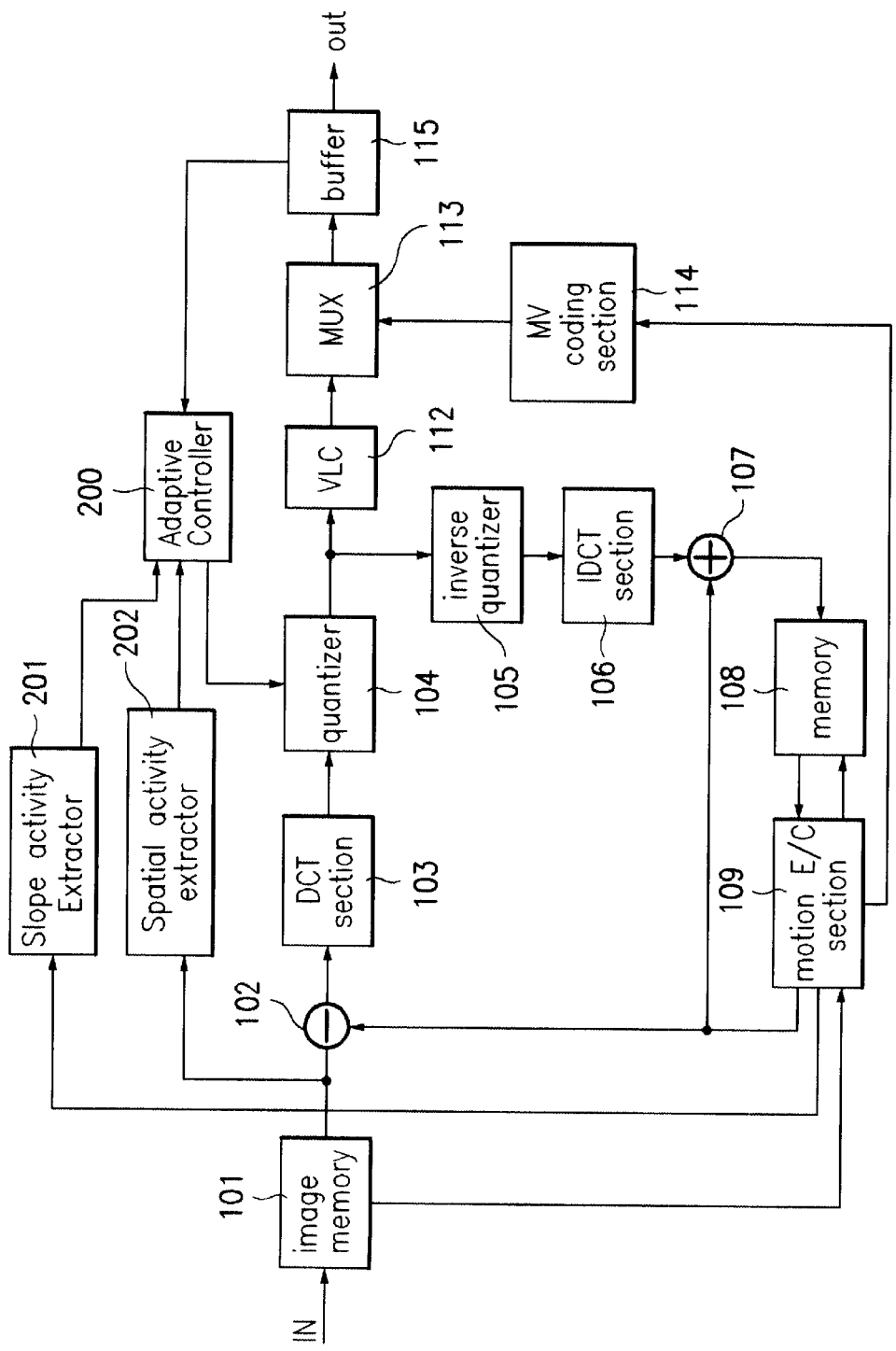
FIG. 4 is a block diagram showing an embodiment of the encoder employing an adaptive quantization control method according to the present invention.
Figure 5:
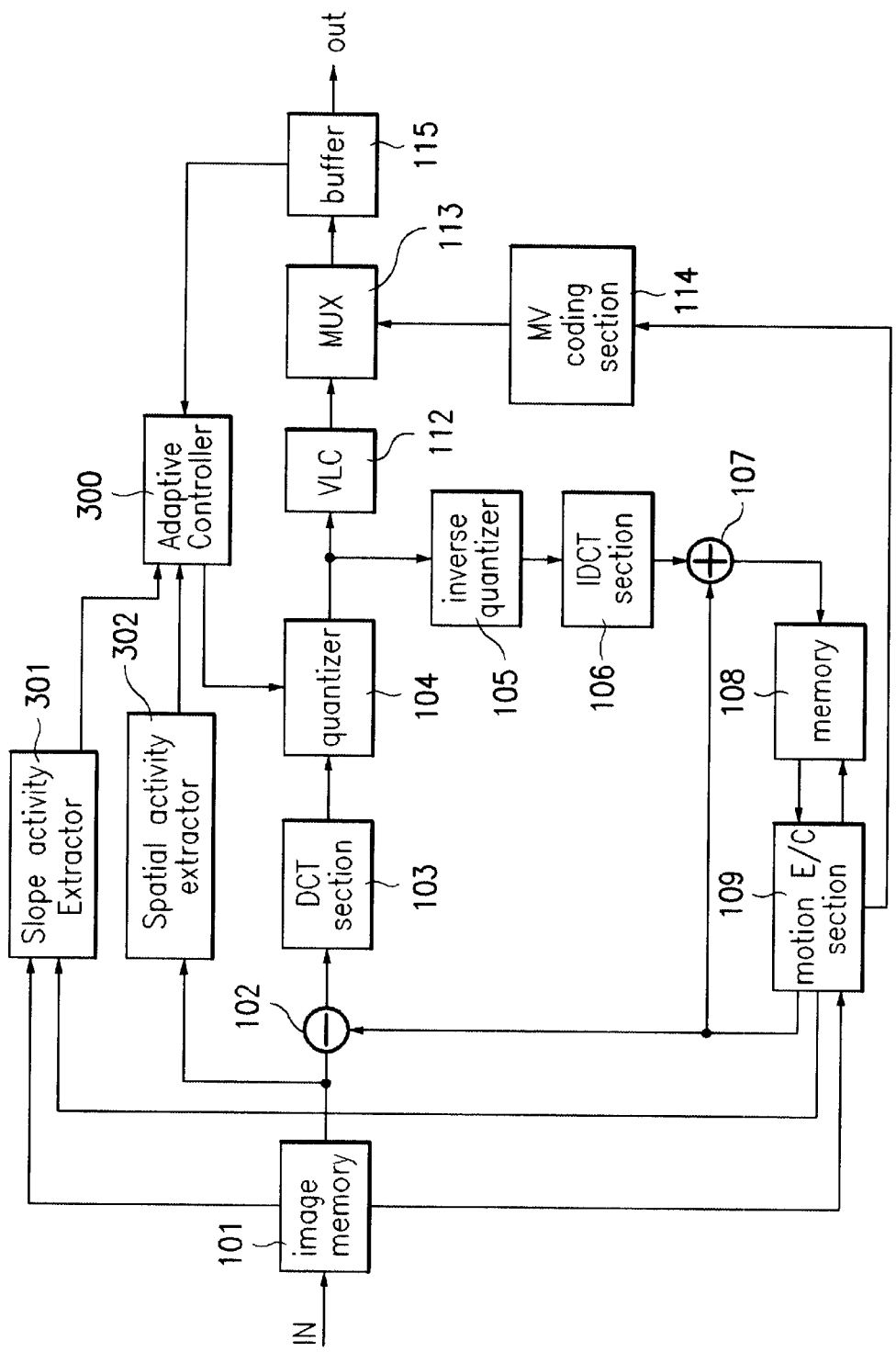
FIG. 5 is a block diagram showing another embodiment of the encoder employing an adaptive quantization control method according to the present invention.

FIGS. 4 and 5 show a video encoder using an adaptive quantization controlling method according the present invention. As in the video encoder of the related art shown in FIG. 1, the video encoder in the present invention also includes an image memory 101, a subtractor 102, a DCT section 103, a quantizer 104, an inverse quantizer 105, an IDCT section 106, an adder 107, a memory 108, a motion estimation/compensation section 109, a VLC 112, a 113 MUX, a MV coding section 114, and a buffer 115.

However, for an adaptive quantization taking into consideration the characteristic of the picture and target bit allocation (the buffer capacity), the video encoder according to the present invention further includes respectively, a slope activity extractor 201 and 301 obtaining a slope activity; a spatial activity extractor 202 and 302 detecting a spatial activity in TM5 and a texture region, and performing a brightness masking; and an adaptive controller 200 controlling the quantization step of the quantizer 104 utilizing the spatial activity selectively and adaptively.

Particularly, FIG. 4 is an embodiment of a video encoder for obtaining a slope activity from the motion-compensated data, and FIG. 5 is another embodiment for obtaining a slope activity from the residual data of MBs. Essentially, the adaptive quantization controlling method of the present invention includes the steps of obtaining the spatial activity according to the variance of the current block to be encoded and the slope activity according to the motion of the current block; and selectively using either the spatial or slope activity according to the result of comparison between the obtained spatial activity value and threshold values.

In the adaptive quantization, the spatial activity of a MB is obtained by its variance as compared to the average value of all blocks. The slope activity of a picture is obtained by the amount of the slope at the boundary of a current block as compared to the average of the slopes of all MBs. The quantization is determined based upon the spatial activity if the spatial activity is below a first threshold value and based upon the slope activity if the spatial activity exceeds a second threshold value. Also, the adaptive quantization according to the present invention further includes the obtaining texture and bright regions for coarse quantization of the corresponding block to save bits.

To extract regions which must be quantized more finelly, a region which may have high level of blocking effect is determined. As explained above, much blocking effect occurs when motion compensation is not well achieved. As shown in FIG. 2, these regions have much blocking effect at the boundary of the macro block in the predicted frame. There has been many approaches proposed to reduce the blocking effect, one of which is a gradient projection method proposed by Minami and Zakhor in "An Optimization Approach for Removing Blocking Effects in Transform Coding" IEEE Transactions on Circuits and Systems for Video Technology, vol. 5, no. 2, April 1994, pp. 76–77, fully incorporated herein.

The article proposes a mean square difference of slope (MSDS) measure to express the blockiness of a MB. Accordingly, the slope activity obtained from using the slope measure is calculated for each block sequentially in the order from left to right, and from top to bottom. However, the slope measure does not produce satisfactory results in many blocks especially for a sequence having a large motion when the original moving picture is produced by the interlaced scanning because of an excessively large slope between top and bottom fields. Accordingly, a method for determining top and bottom fields separately is used in the present invention.

Figure 6:
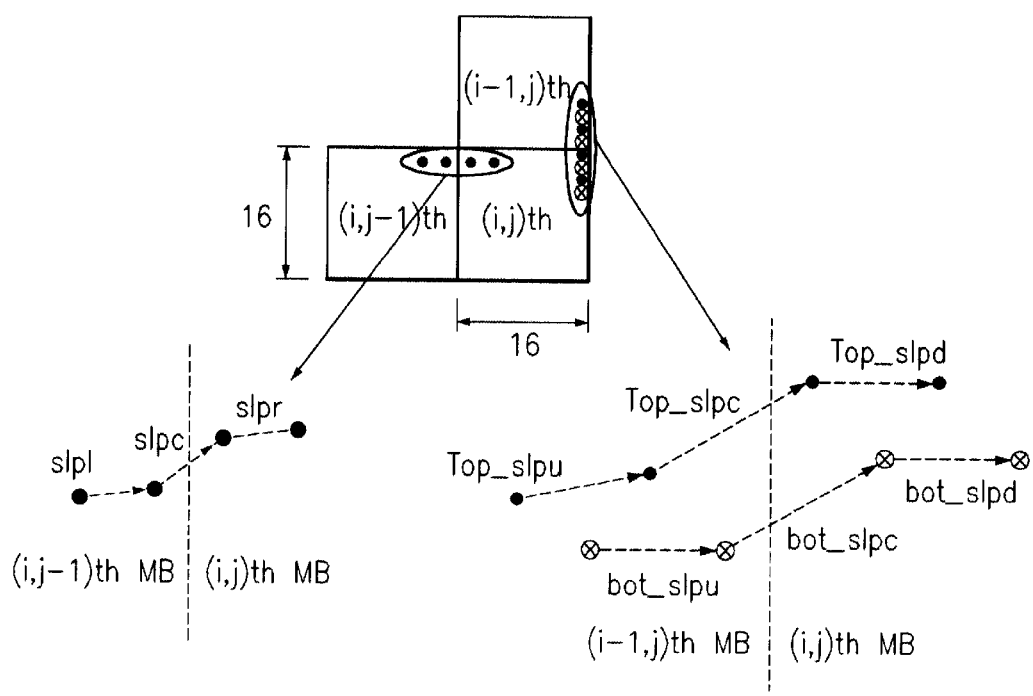
FIG. 6 is an illustration for explaining a macro block slope according to the present invention.

Therefore, the slope activity is utilized to determine and extract the portion which requires more fine quantization. The region extraction for more fine quantization is shown in FIG. 6. In consideration of implementing the hardware, only the slopes formed between the current macro block with the left and top macro blocks may be obtained. In such case, the slope with the left block is first obtained in the same manner as the MSDS measure. However, the slope with the upper block is obtained by selecting the larger one of the slopes obtained from the top or bottom fields.

In reference to FIG. 6, the equations for calculating the slopes are given by Equation 8 for a horizontal slope with the left block and Equation 9 for a vertical slope with the top. Because each macro block is formed by 16×16 pixels, these calculations are performed 16 times in both the horizontal and vertical directions. The calculated slopes are summed to obtain the slope of the current macro block.

$$\text{Slope}_H = \{slpc - (slpl + slpr)/2\}^2 \quad \text{[Equation 8]}$$

$$\text{Slope}_v = \max\{\{top\_slpc - (top\_slpu + top\_slpd)/2\}^2, \{bot\_slpc - (bot\_slpu + bot\_slpd)/2\}^2\} \quad \text{[Equation 9]}$$

Figure 7:
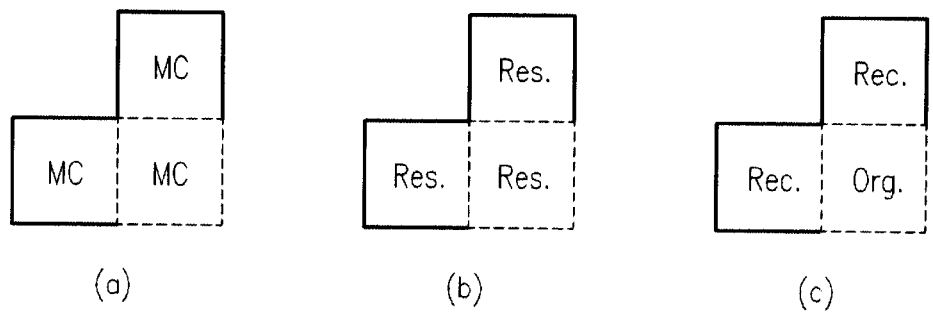
FIGS. 7(a) to (c) are diagrams showing different examples of a method for extracting a slope activity according to the present invention.
Figure 8A:
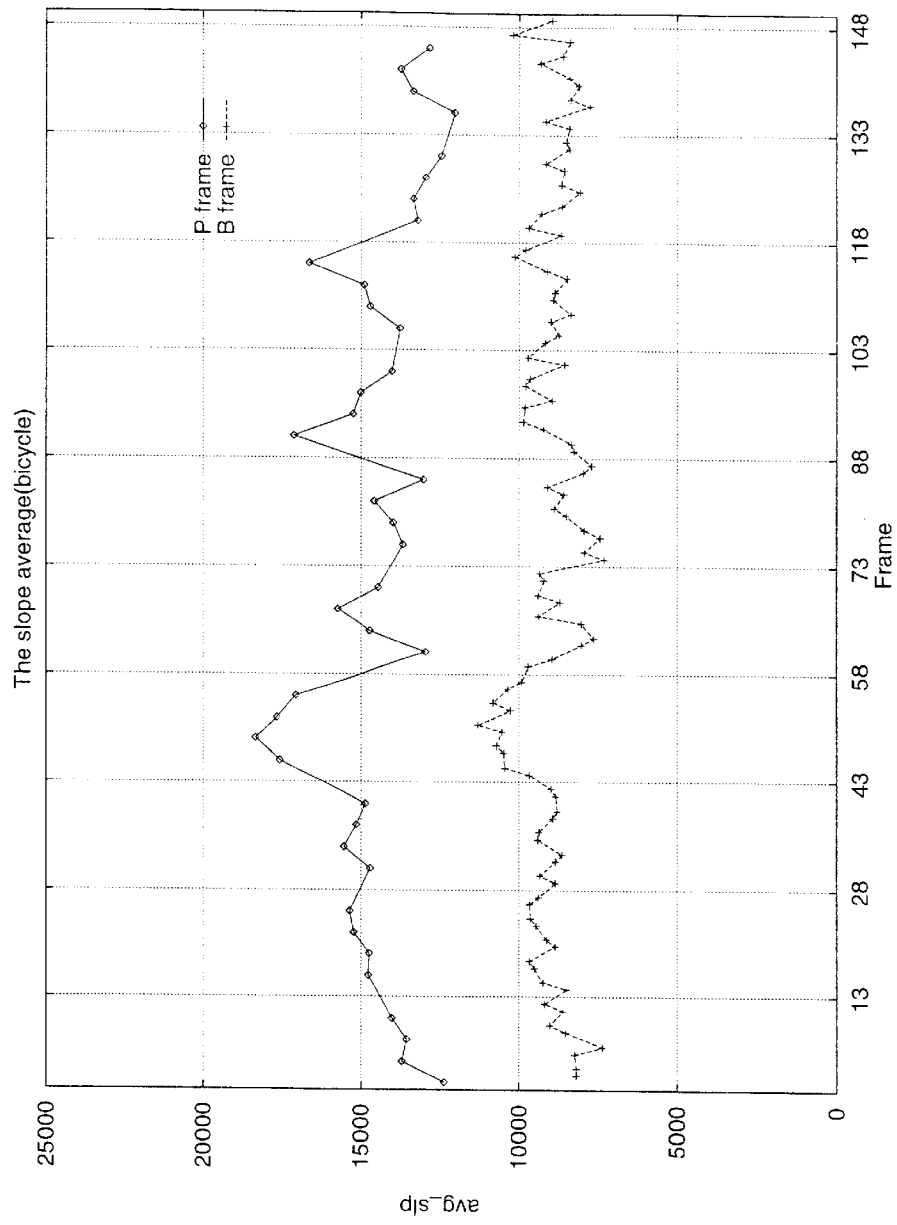
FIGS. 8(a) to (d) are graphs showing an average slope in P and B frames.
Figure 8B:
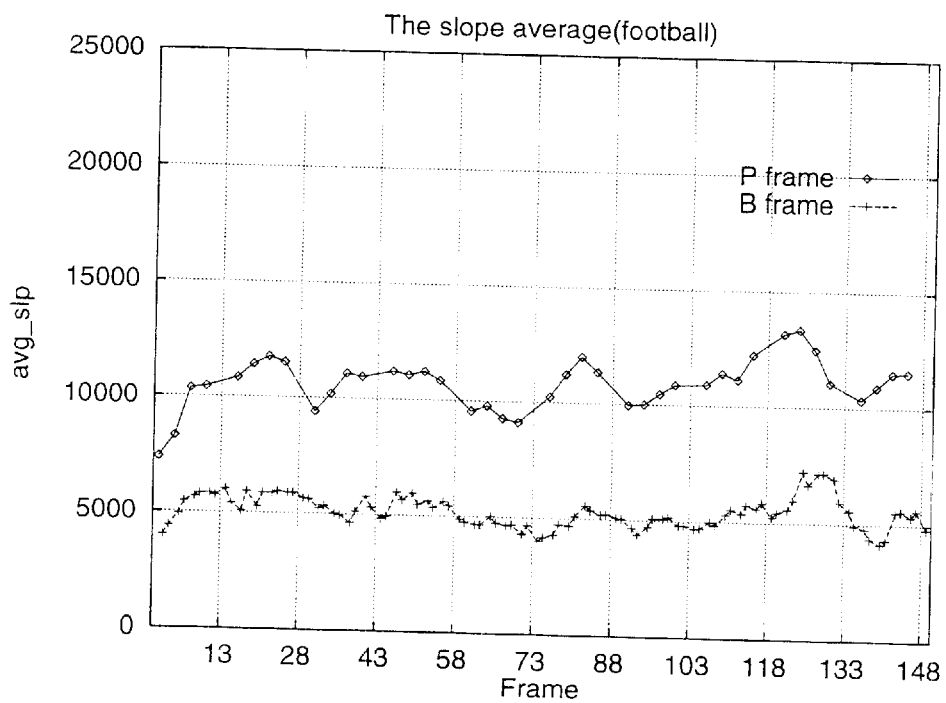
Figure 8C:
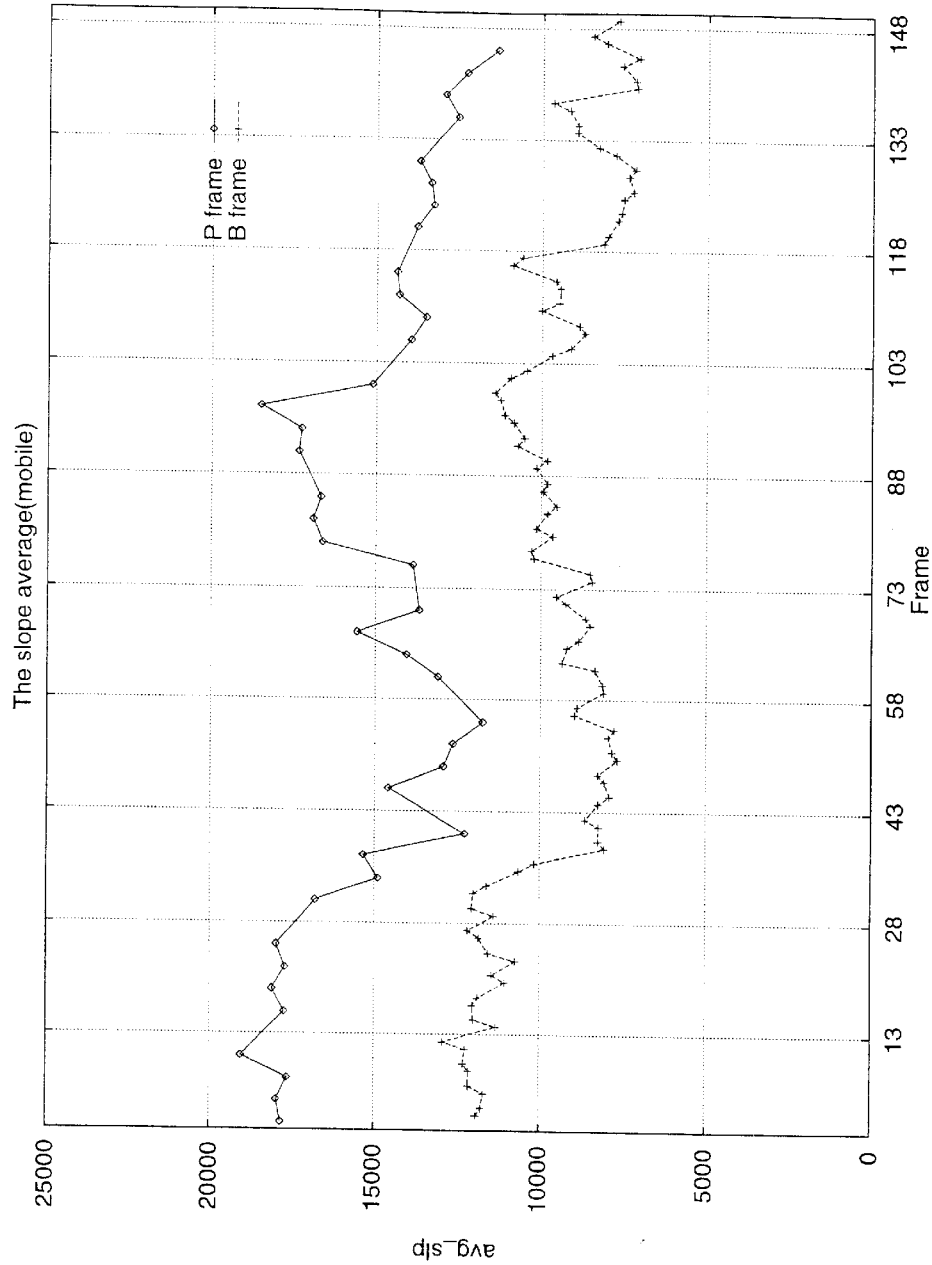
Figure 8D:
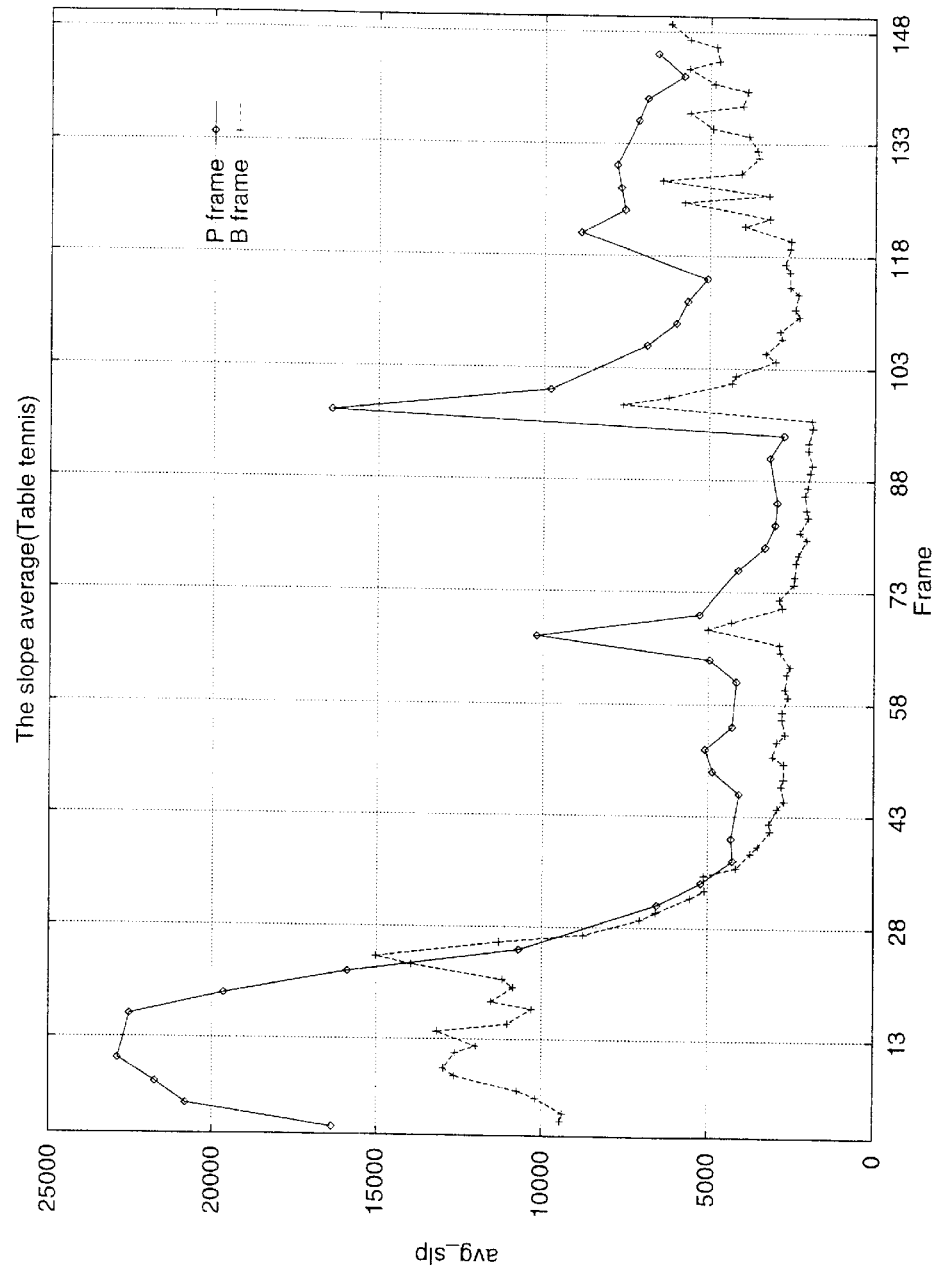

In order to utilize the slopes to extract regions for more fine quantization, the three cases as shown in FIGS. 7(a)–(c) may be considered when calculating the slopes. The slopes calculated for motion compensated block of part (a) and the residual block of part (b) may determine the portion where motion compensation is not well achieved, as embodied in FIGS. 4 and 5 respectively. The slope calculated for the original block of part (c) may determine how much blocking effect appears in the reconstructed picture. Although, the calculated slopes in the MSDS measure has different meanings from the slopes as utilized according to the present invention, the blocking effect in pictures occurs regions where motion compensation is not well achieved. Therefore, by determining regions where much blocking effect may occur, the regions where motion compensation would not be well achieved may also be determined and extracted, thereby allowing to perform more fine quantization for these extracted regions.

Utilizing the obtained slopes for extracting regions for precise quantization produces fairly good results. However, a problem of whether a reconstruced video data of a previous macro block can be produced during coding of the current macro block may arise for case (c). Also, for case (a), a large slope may be generated when the edge portion of the image itself overlaps with the block boundary. These problems may be prevented using the residual image.

As discussed above, the I frame type of picture does not have much blocking effect. Thus, slope calculation is excluded when the current macro block is an intra mode. Accordingly, if the neighboring macro blocks are in the intra mode, the MBs are substituted by the MBs of the original picture when the slope measure is calculated from the prediction frame and the MBs are substituted by 0 value MB when the slope measure is calculated from the residual frame.

Assuming that the offset quantization parameter determined by the buffer state for every frames is $Q_j$, the actual DCT coefficient is quantized by a quantization parameter as expressed by mquant$_j$=g($Q_j$×N_act$_j$), wherein N_act$_j$ is defined as discussed above. In order to convert N_act$_j$ as a function of the obtained slope, a similar method to the TM5 is utilized. The function would be a reciprocal of N_act$_j$ since N_act$_j$ is inversely proportional to the slope. In other words, macro block having larger slope is quantized more finely.

For purpose of preventing confusion, the N_act$_j$ obtained by the spatial activity in TM5 will defined as S_act$_j$ and the function determined by the slope will be defined as P_act$_j$. Assuming the slope of the current macro block is slp$_j$, P_act$_j$ is given by Equation 10 below, $$P\_act_j = \frac{slp_j + \text{avg\_alp}}{2 \times slp_j + \text{avg\_slp}} \quad \text{[Equation 10]}$$

where avg_slp is the average slope of the current picture and is substituted by the value obtained from the previous picture of the same type like TM5. FIGS. 8(a)–(d) is a comparison of the current frame and the previous frame, showing insignificant differences between the current and previous frame. The two outstanding peaks in part (d) are caused by scene changes.

Figure 9:
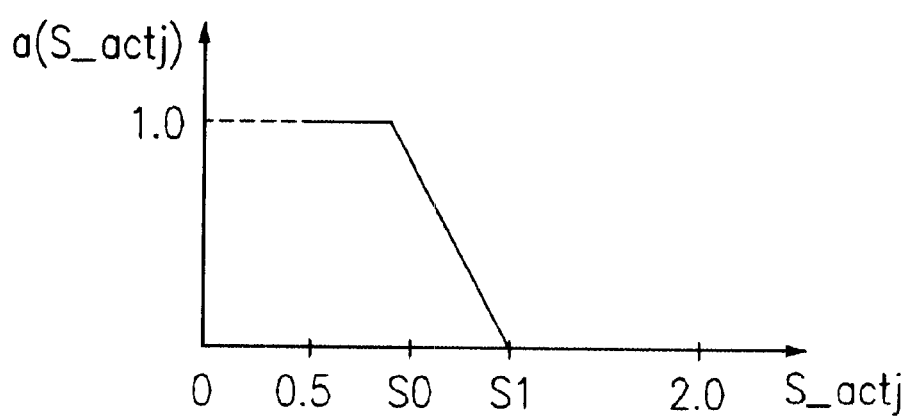
FIG. 9 shows a weighting pattern between $S\_act_j$ and $P\_act_j$.
Figure 10A:
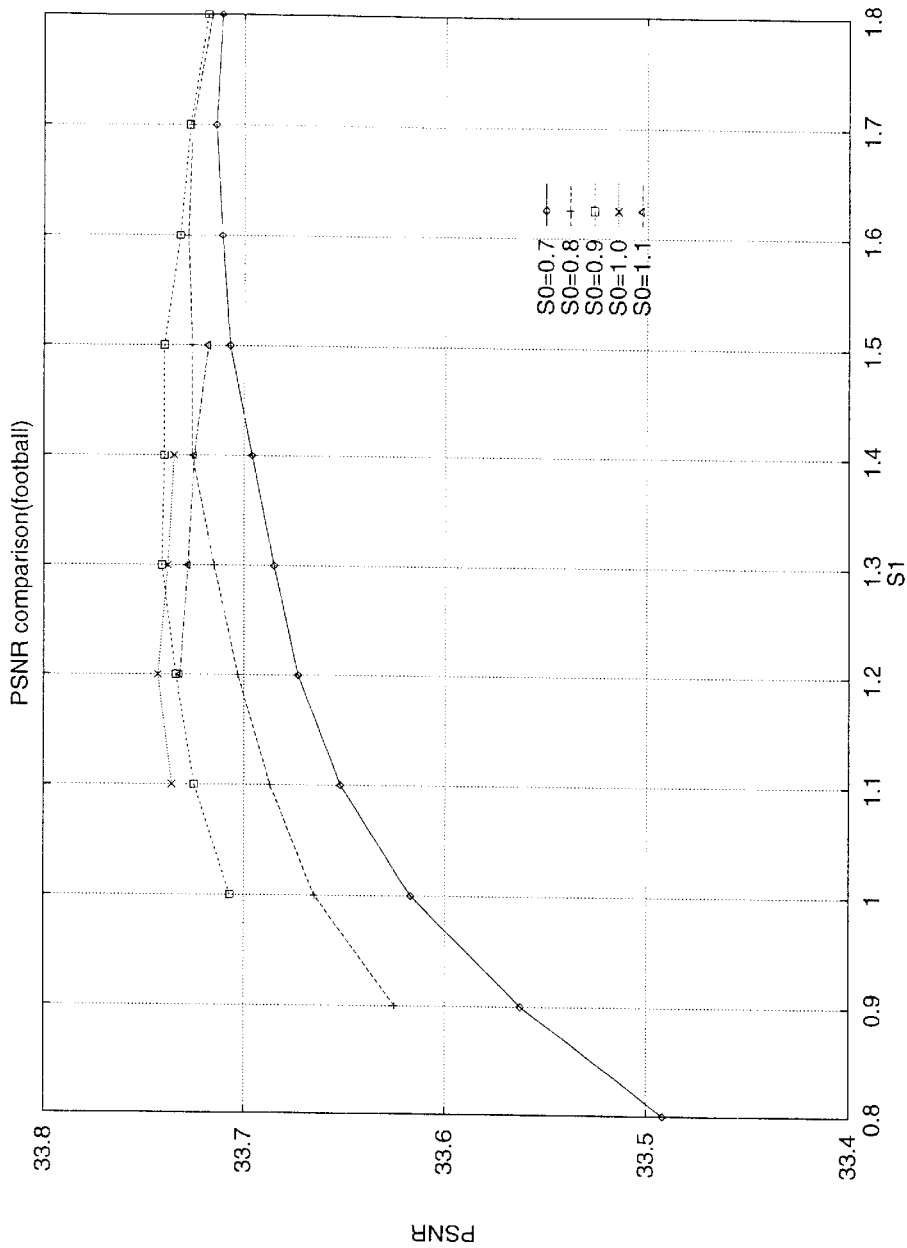
Figure 10B:
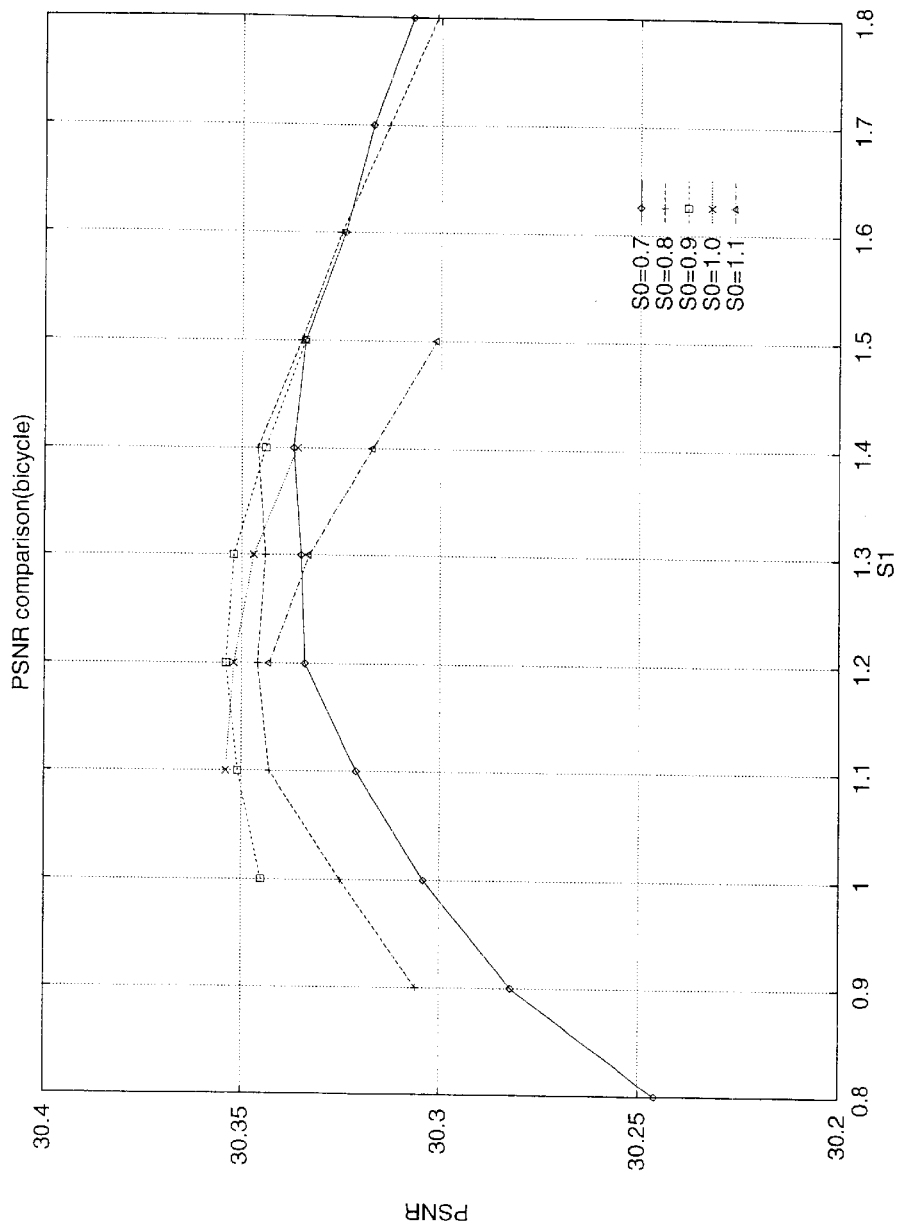
Figure 10C:
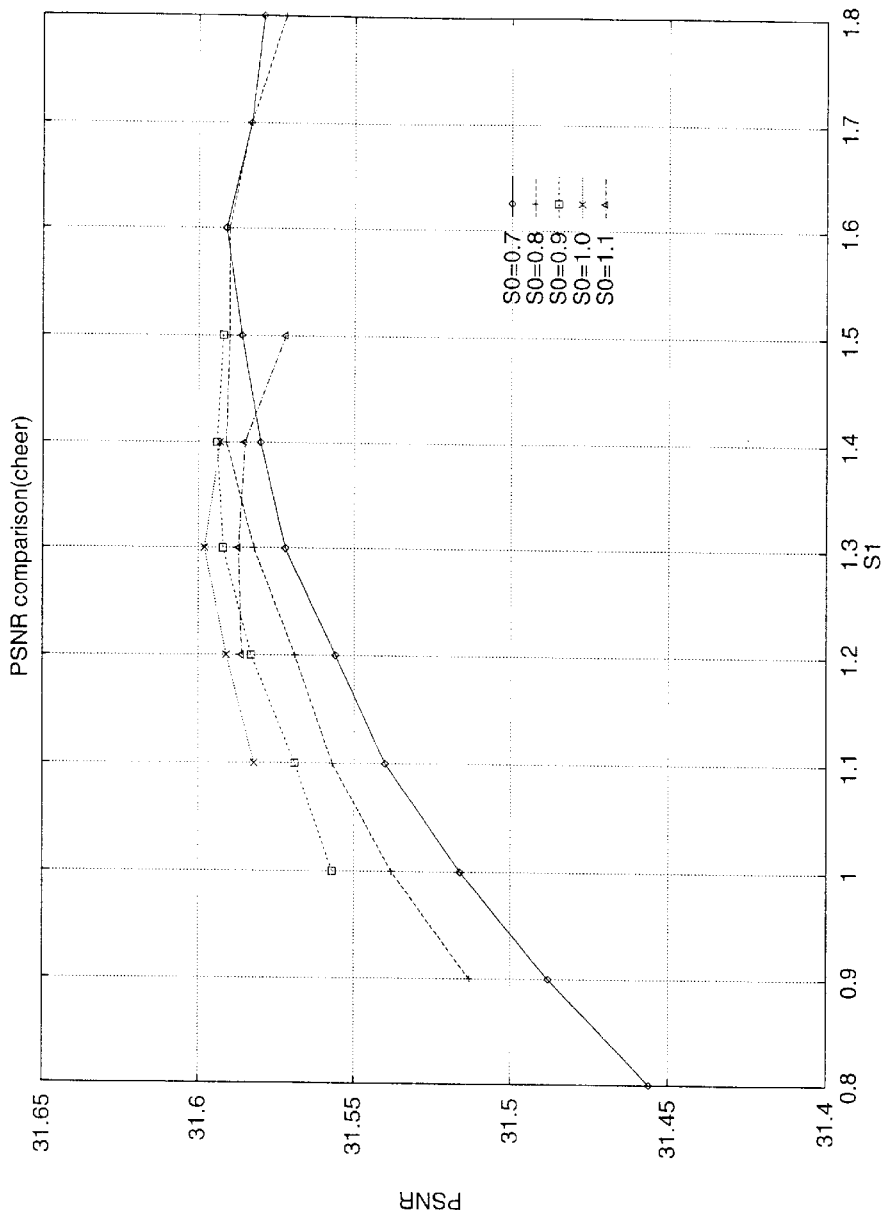
Figure 10E:
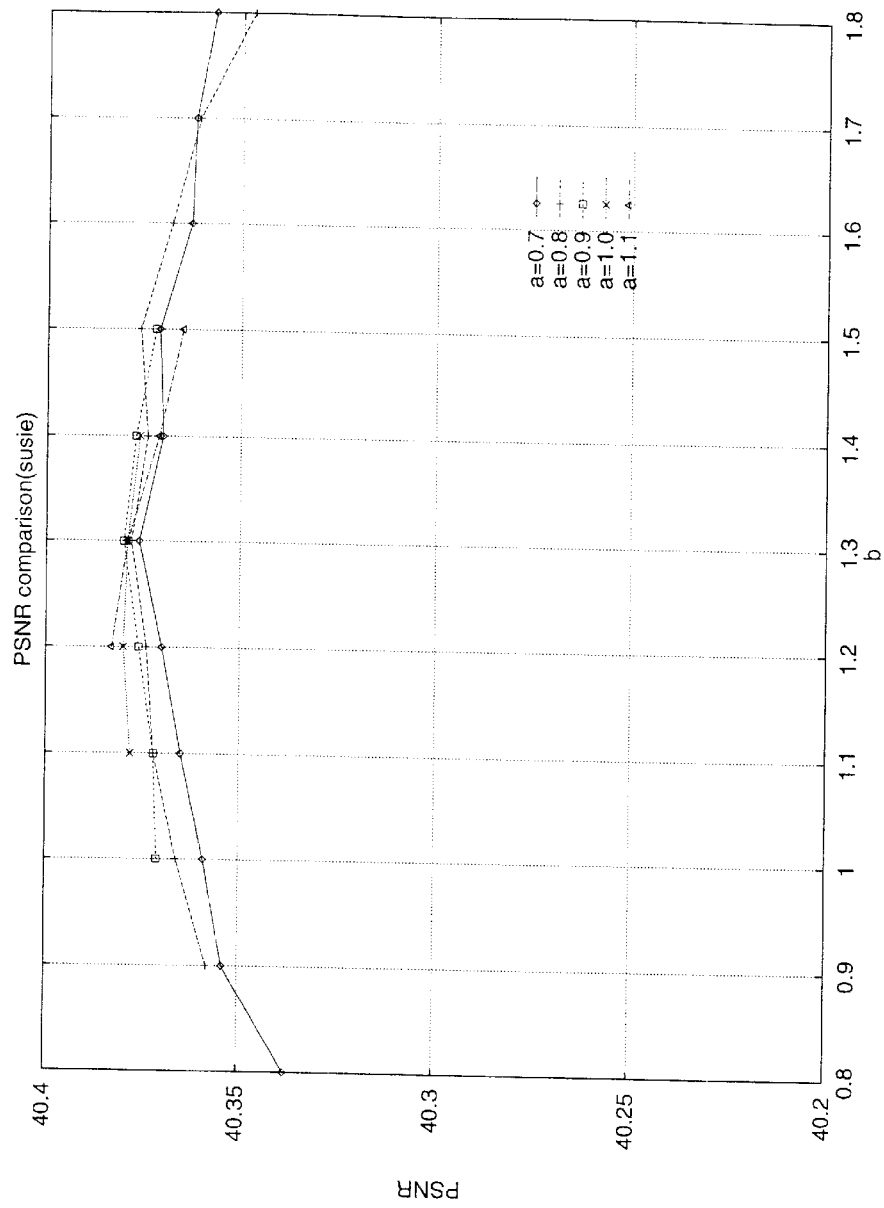

Assuming that the complexity measure of a macro block is N_act$_j$, it can be calculated from P_act$_j$ obtained using the slope and S_act$_j$ obtained from the spatial activity as follows, $$N\_act_j = a(S\_act_j) \times S\_act_j + (1 - a(S\_act_j)) \times P\_act_j \quad \text{[Equation 11]}$$

where a(S_act$_j$) is a function of S_act$_j$ ranging from 0 to 1. As shown in FIG. 9, a(S_act$_j$) enlarged in region with less spatial activity but smaller in a complex region of high spatial activity.

FIGS. 10(a)–(e) show an experimental data for monitoring the peak signal to ratio (PSNR) to determine the threshold values S0 and S1 by mapping the fluctuation of PSNR for different values of S0 while varying S1. As shown in FIGS. 10(a)–(e), there were minimal fluctuations in the PSNR for the pictures and the subjective image quality does not seem to be very sensitive to S0 and S1. In the preferred embodiment, the S0 is determined as 0.9 and S1 is determined as 1.3.

Figure 3:
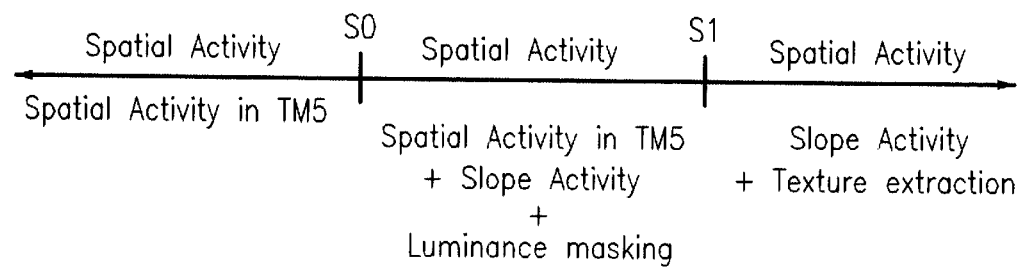
FIG. 3 is an illustration for explaining the concept of the adaptive quantization control method according to the present invention.

Referring back to FIG. 3, when the spatial activity is below the threshold value S0, a(S_act$_j$)=1 and N_act=S_act$_j$ as determined in Equation 11 above. Thus, the quantization is controlled by the level of spatial activity S_act$_j$. If the spatial activity is between the threshold values S0 and S1, the value of a(S_act$_j$) decreases as the spatial activity increases and N_act$_j$ is dependent on both the spatial activity S_act$_j$ and the slope activity P_act$_j$, with more weight on the slope activity as the spatial activity increases. Accordingly, the quantization is controlled taking into consideration both the spatial and slope activity. If the spatial activity is greater than threshold value S1, a(S_act$_j$)=0 and N_act$_j$=P_act$_j$. Thus, the quantization is controlled by the level of slope activity P_act$_j$.

Figure 11A:
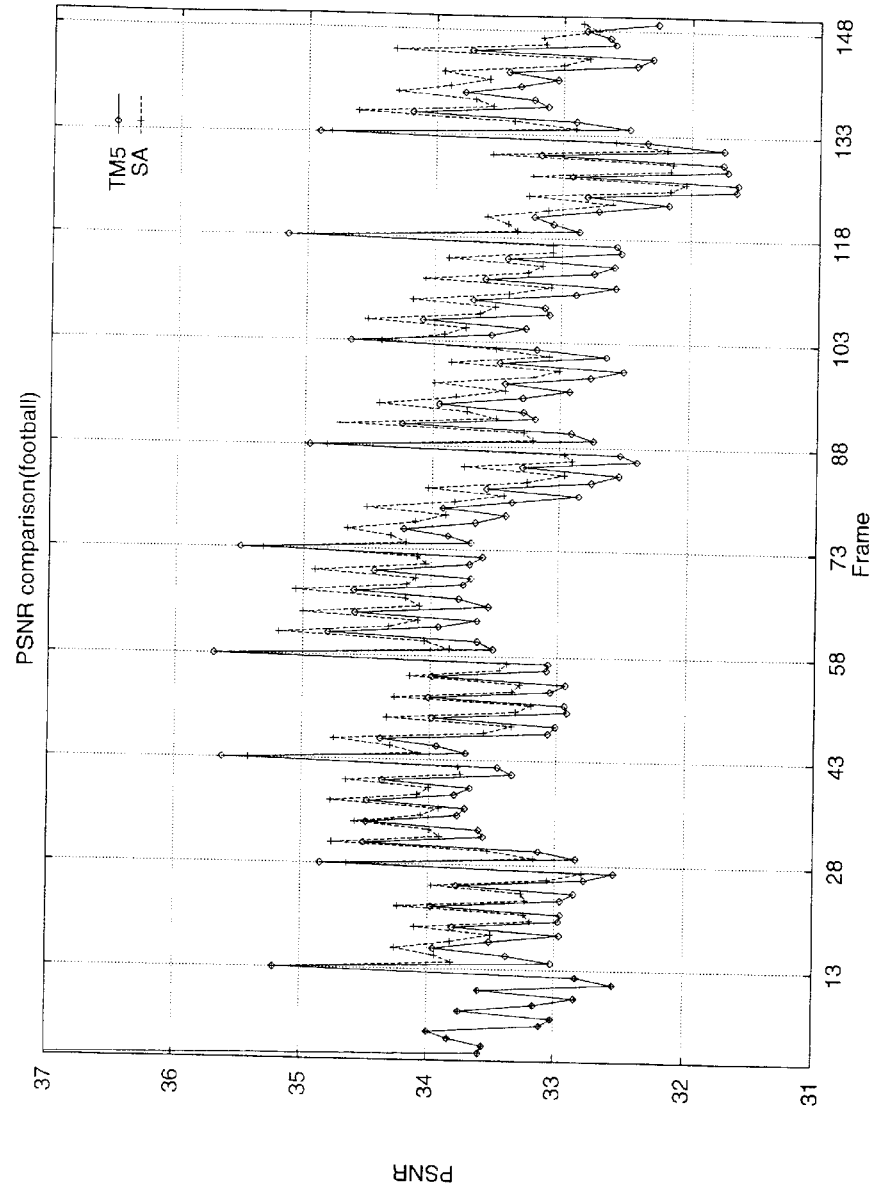
FIGS. 11 (a) and (b) are graphs for comparing TM5 and PSNR according to the present invention.
Figure 11B:
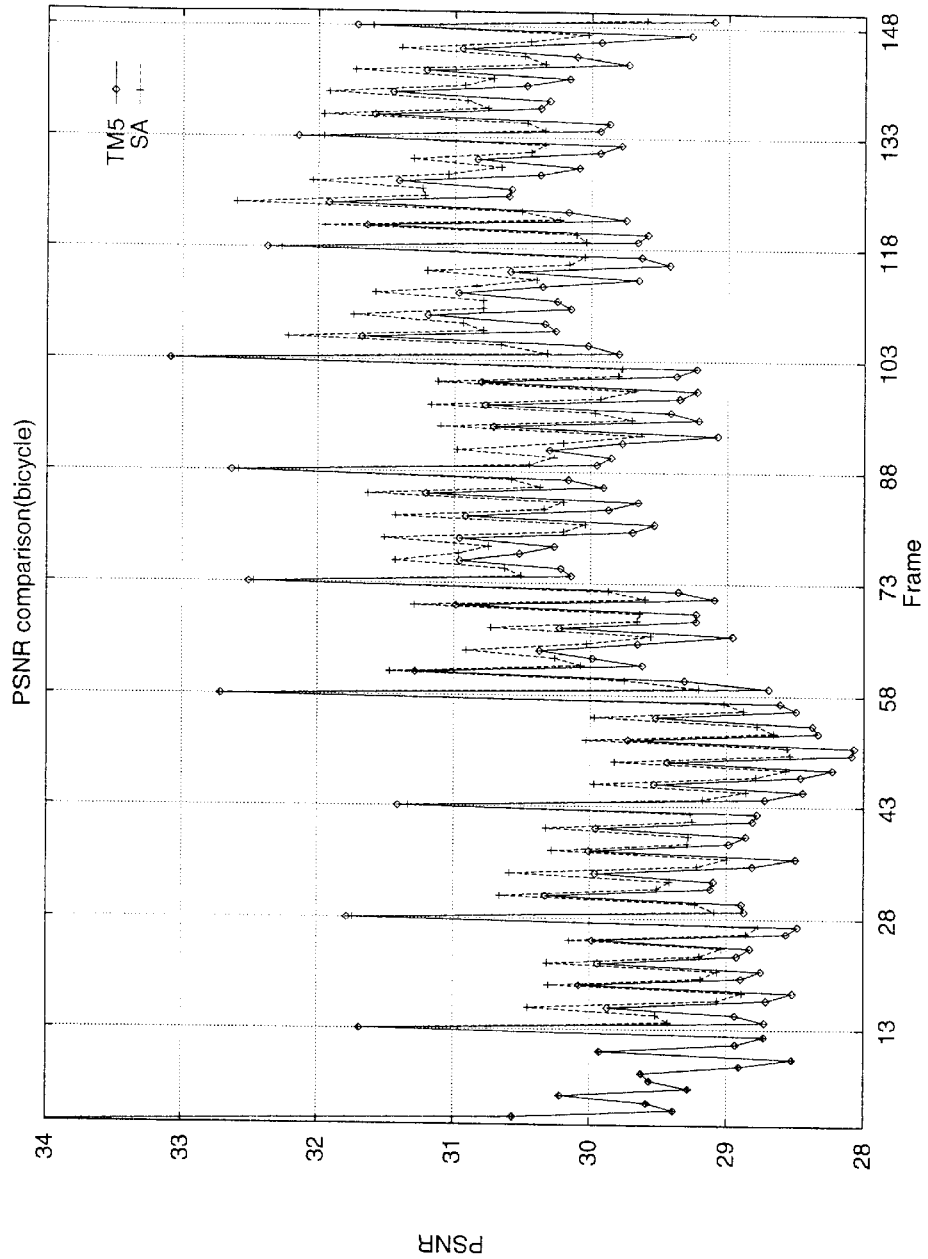

By applying the adaptive quantization according to the present invention, the subjective image quality is enhanced by mitigating the blocking effect that occurs around rapidly-moving objects. Also, the PSNR is enhanced overall in every frame except the I frame. A general enhancement of PSNR results with fine quantization of regions where motion is not conjectured enough even if more bits are used. In the present invention, more bits are used than the TM5 for the precise quantization of the P and B frames. To compensate for using more bits, less bits are used for I frames than TM5. As a result, PSNR has declined a little in I frames, but not enough to affect the subjective image quality. FIGS. 11 (a) and (b) is a comparison of the PSNR in two picture recovered by the TM5 method according to related art and the method according to the present method.

Figure 12A:
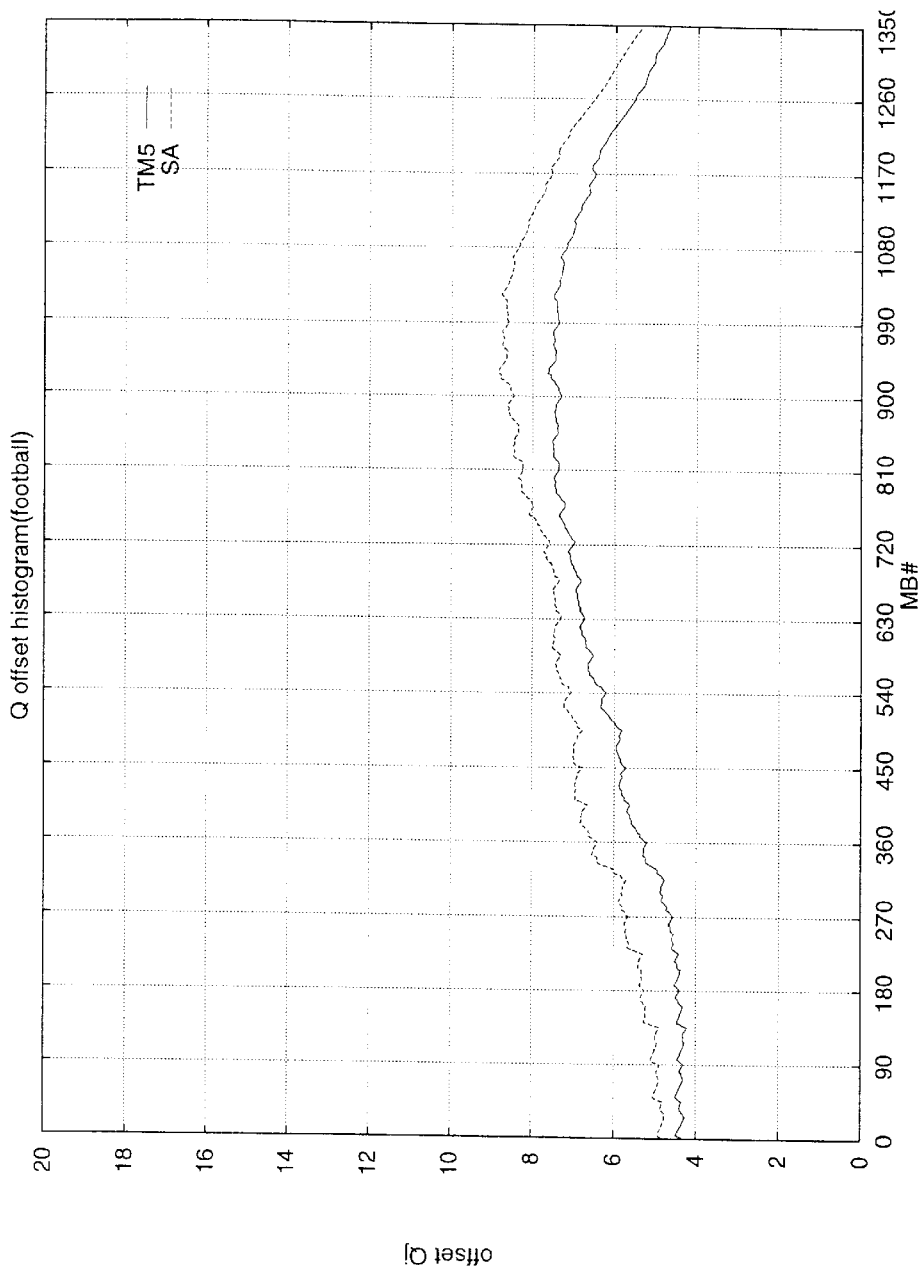
FIGS. 12(a) to (c) are illustrations showing an example of graph for explaining an offset $Q_j$ in the present invention.
Figure 12B:
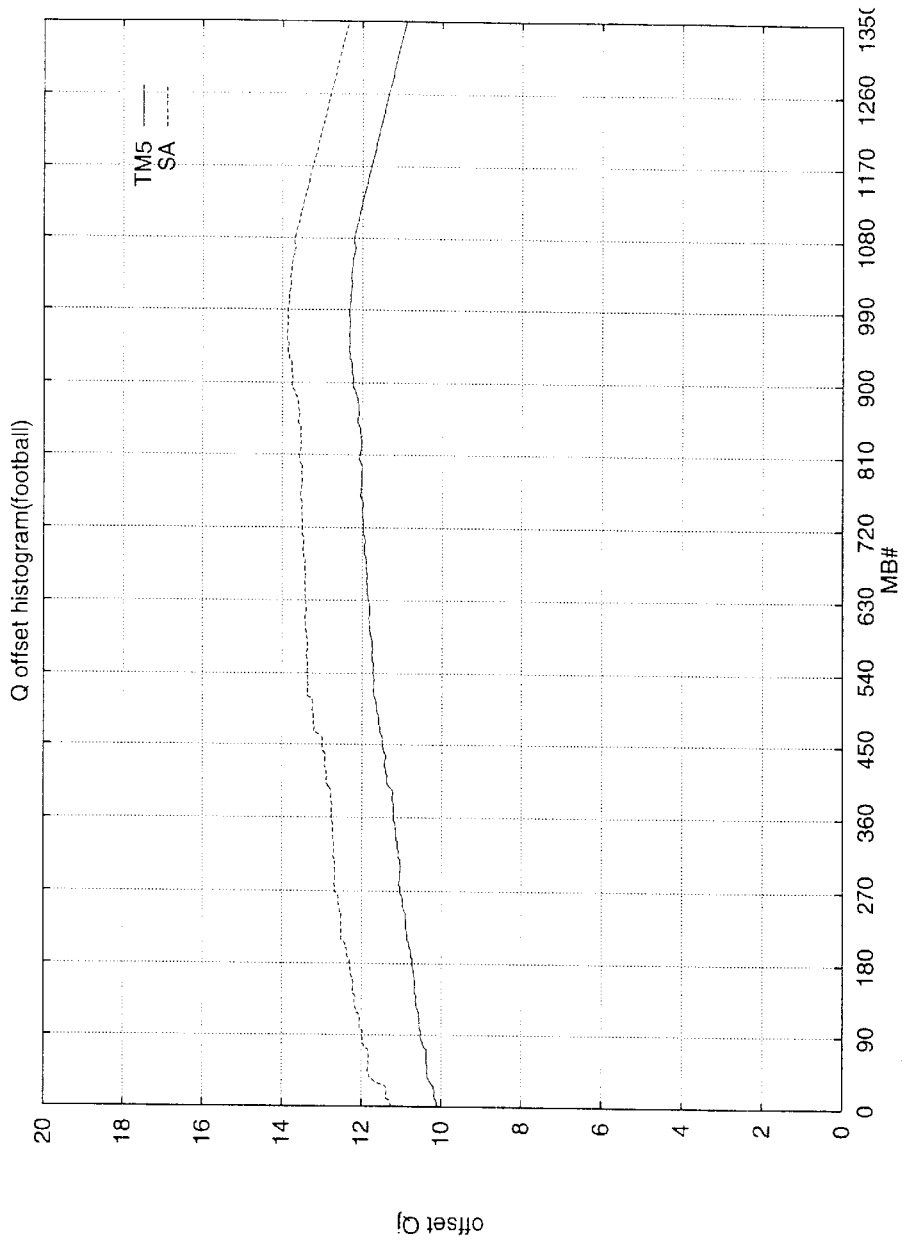
Figure 12C:
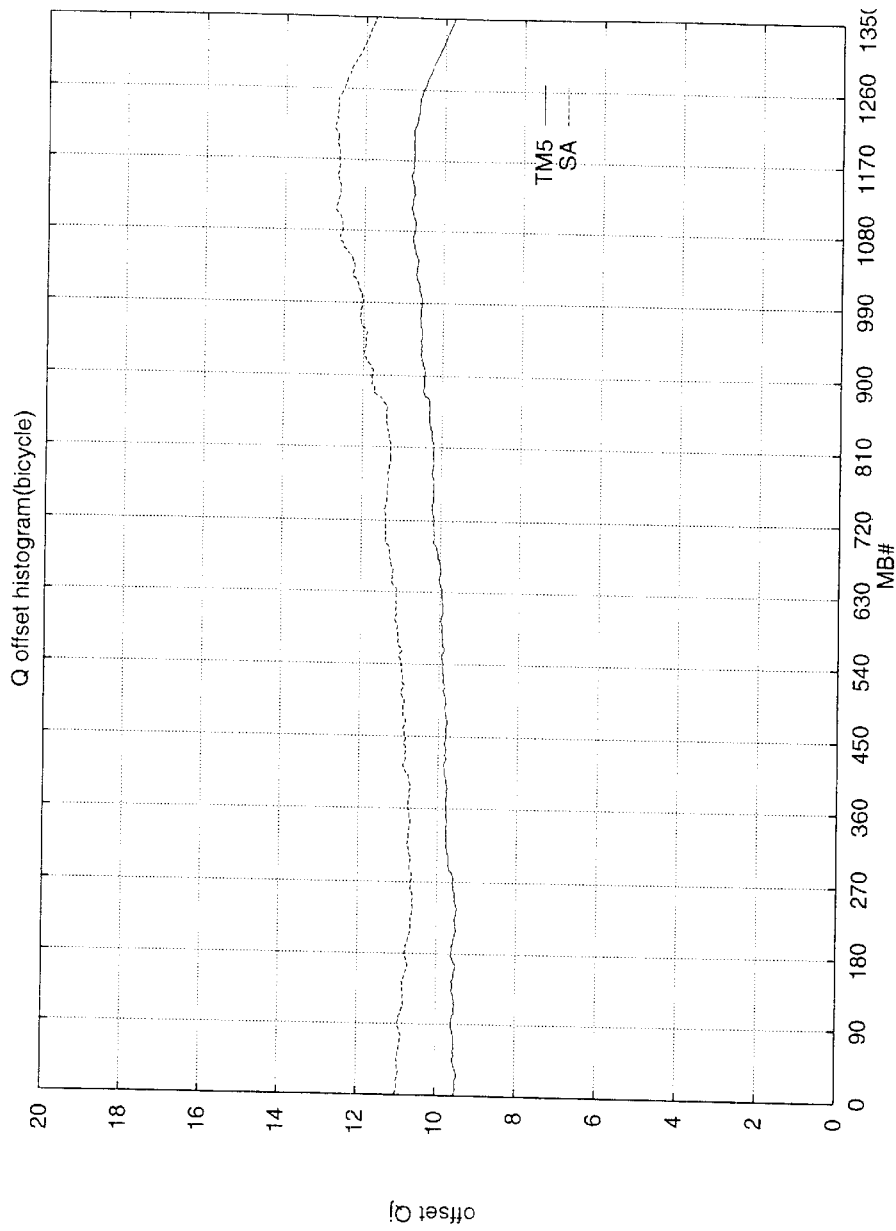

As shown in FIGS. 12(a)–(c), the MBs which would have been coarsely quantized by the TM5 method is finely quantized according to the present invention, resulting in a general rise of the offset $Q_j$ due to a feedback by a buffer level risen because more bits were generated taking into consideration the slope activity. However, the difference in the offset $Q_j$ is not significant. Moreover, when the spatial activity is low, difference in the actual quantization parameter mquant$_j$ for quantizing the DCT coefficients would be minimal because mquant$_j$=g($Q_j$×N_act$_j$) where N_act$_j$ would be small. By finely quantizing the frames with high spatial activity, the blocking effect is significantly reduced.

However, even when blocking effect would not have been visible to the naked eye, some frames with a high spatial activity may be finely quantized due to a high level of slope activity. As a result, many macro blocks would use more bits which increases the level of the buffer, thereby affecting the image quality. To reduce the number of bits, texture areas which would be too finely quantized are extracted and quantized coarsely.

Figure 13:
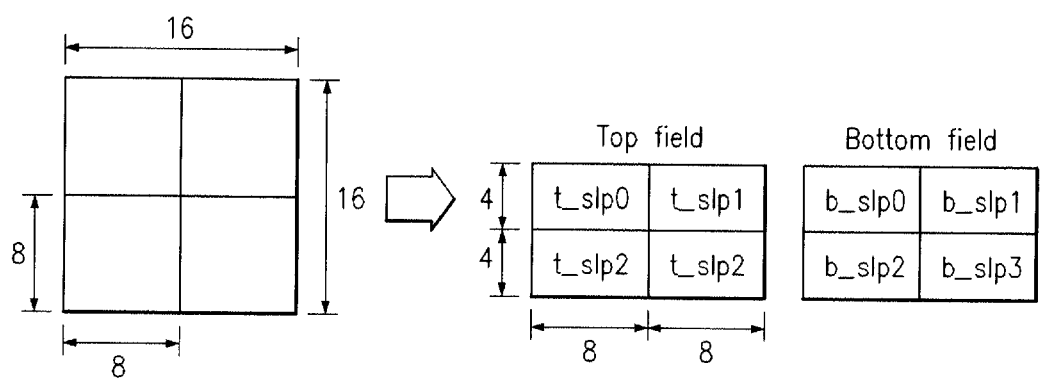
FIG. 13 is a diagram illustrating a method for defining subblocks according to the present invention.

The texture areas for coarse quantization are determined and extracted by a method of defining subblocks in each macro block, obtaining their variance distribution, and forming ajudgment from an average and a mutual differences. The method is shown in FIG. 13. Generally, four subblocks of 8×8 may be defined, but in case the original image is for interlaced scanning, two sets of four subblocks totaling eight subblocks of 4×8 are defined after dividing the macro block into the top and bottom field. The variance distribution of the eight subblocks are obtained. Thereafter, the average variance of all the subblocks and the degree of variance fluctuation are utilized to form judgement whether the area is a texture area.

First, for the top field, Vmin is the minimum value of the variances in the 4 subblocks, Vmax is the maximum of the variances in the 4 subblocks, and Vavg is the average of the variances in the 4 subblocks. The obtained values for each macro blocks are subjected to the following equation, Vavg>T0, Vmax/Vmin<T1 [Equation 12]

where T0 and T1 are experimentally selected constants. In the preferred embodiment, values of 100 and 4 are used respectively.

The macro blocks with Vavg, Vmax, and Vmin which satisfies the Equation 12, are subjected to an analogous condition for the bottom field. Namely, if Hmin is the minimum value, Hmax is the maximum, and Havg is the average of the variances in the bottom 4 subblocks, the macro blocks which satisfied Equation 12 is subjected to Equation 13 below.

Havg>T0, Hmax/Hmin<T1 [Equation 13]

The macro blocks which satisfies both equations 12 and 13 is determined to a texture area which would be finely quantized, unnecessarily. To quantize these texture areas more coarsely, the following procedure is utilized.

1) Texture Classification
2) S_act$_j$>S1?
3) P_act$_j$<S_act$_j$?

The value of N_act$_j$ is chosen as bigger one of P_act$_j$ or S_act$_j$ against macro block selected through two processes for texture MB.

$$N\_act_j = \begin{array}{l} S\_act_j \quad \text{if } P\_act_j < S\_act_j \\ P\_act_j \quad \text{otherwise} \end{array} \quad \text{[Equation 14]}$$

Figure 14A:
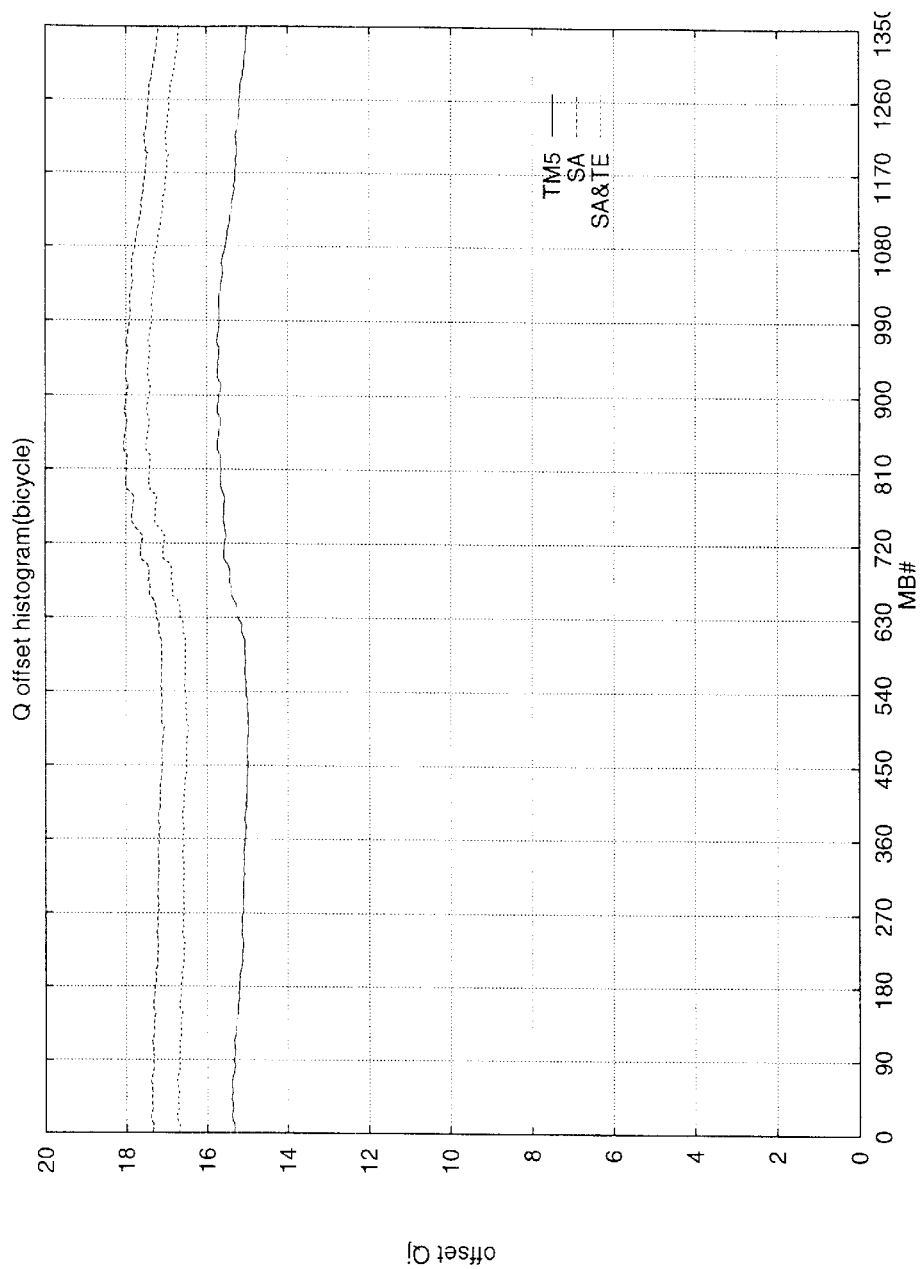
FIGS. 14(a) and (b) are diagrams showing the buffer level lowered by the present invention.
Figure 14B:
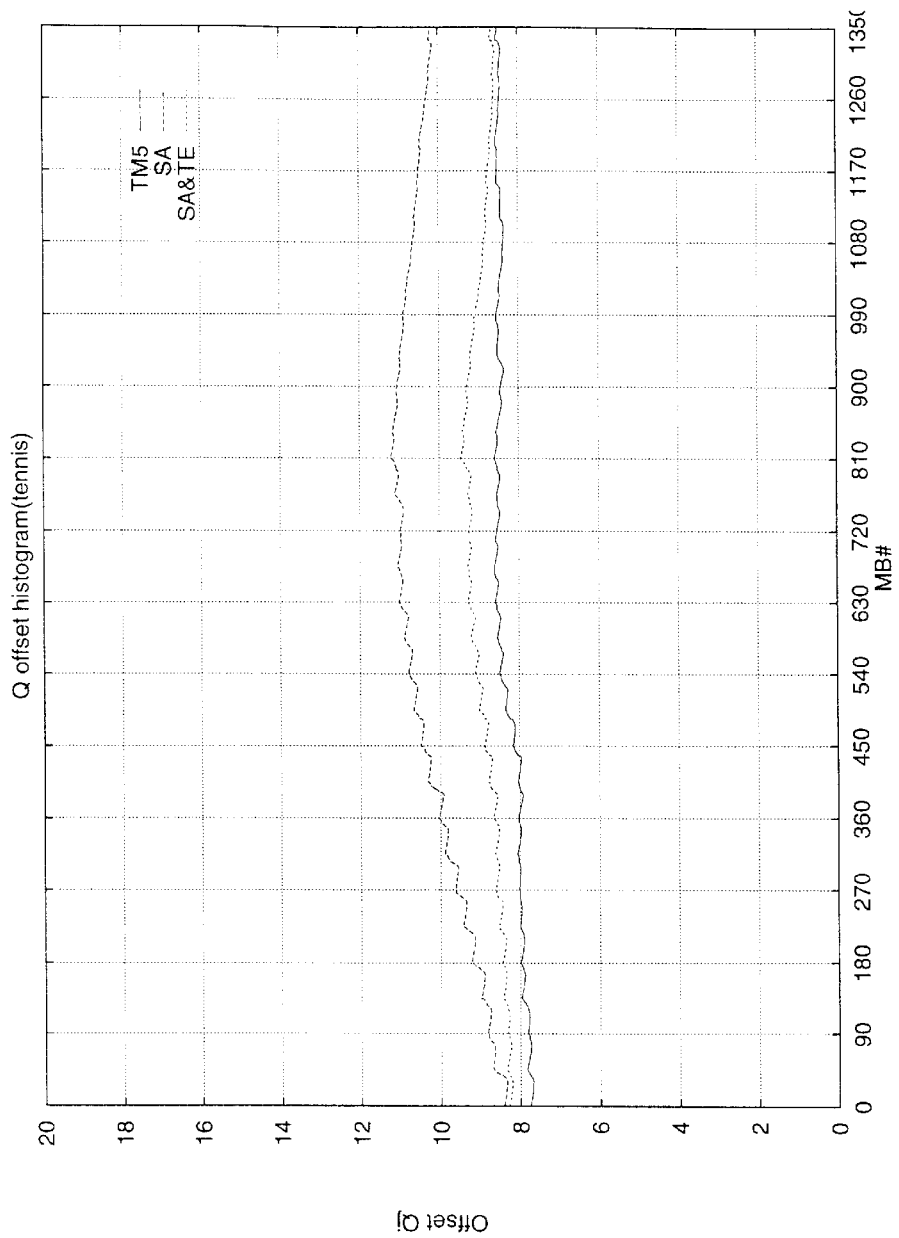

As shown in FIGS. 14(a) and (b), buffer level of a frame is significantly lowered using the spatial activity (SA) and texture extraction (TE) method as compared to the SA method. Thus, it is possible to prevent buffer levels from being increased by coarsely quantizing certain texture areas. The saved bits in the texture area is transferred to another area as the entire offset $Q_j$ level is lowered relative to the SA method. In the buffer based rate control of the TM5, however, the residual bits in the texture area is not transferred to a specified area but are distributed uniformly across the entire picture, which does not remarkably improve the subjective image quality.

Figure 15A:
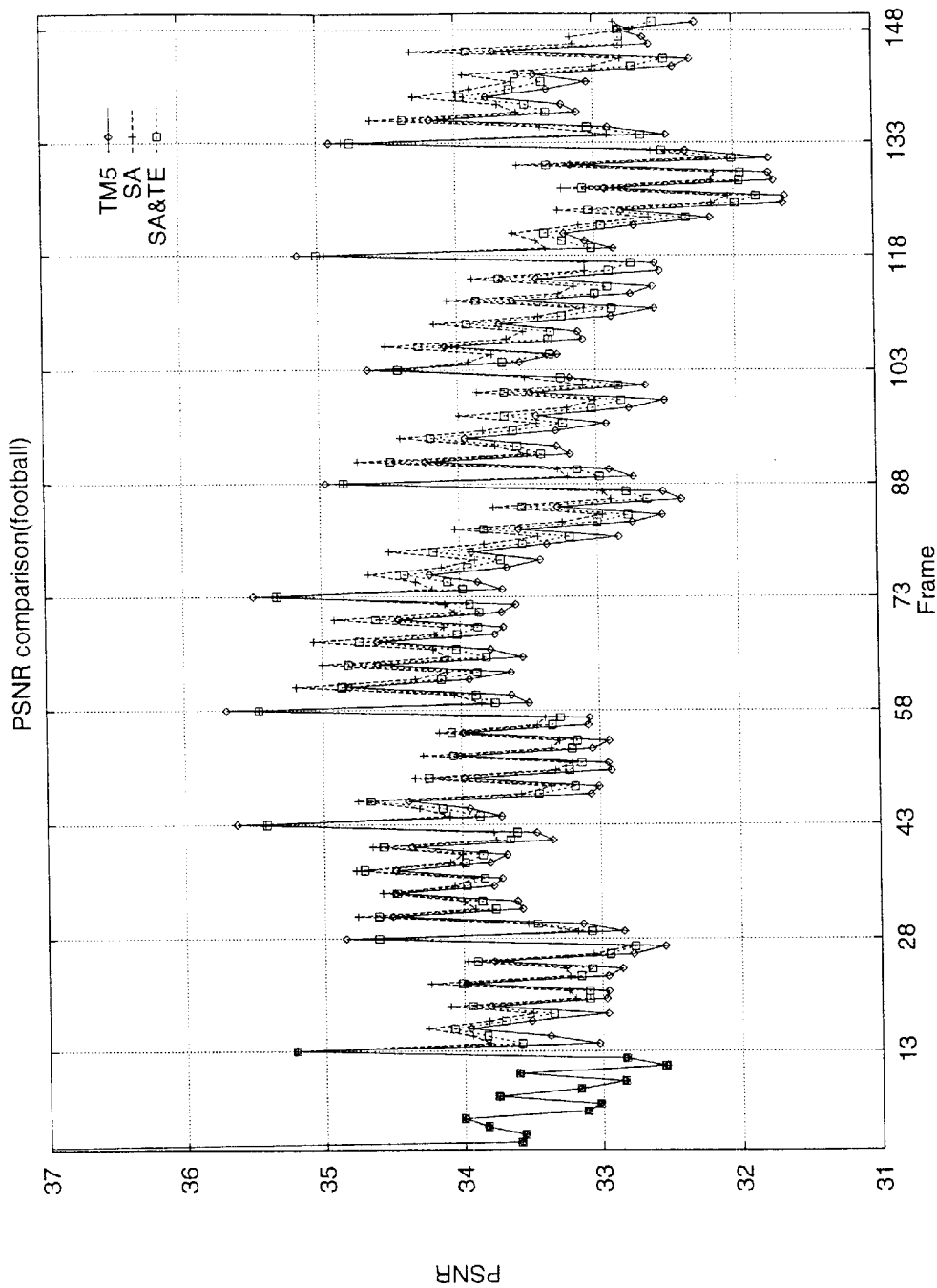
FIGS. 15(a) and (b) are diagrams showing the PSNR enhancement by the present invention.
Figure 15B:
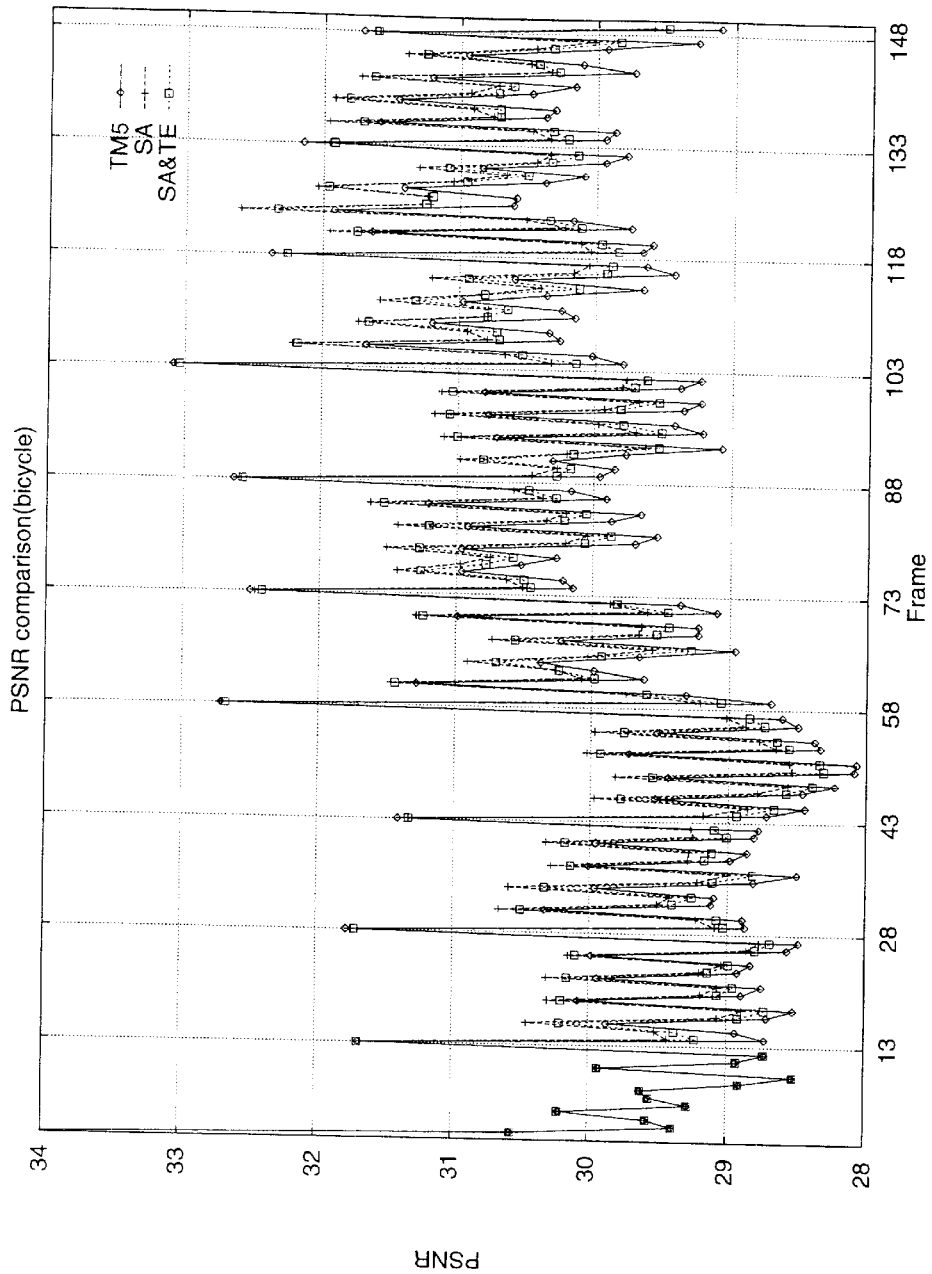

Thus, to improve the image quality, a method uses the saved bits in specified areas which is damaging to the image quality. The PSNR decreases in the texture area and is slightly lower overall in relation to the SA as shown in FIGS. 15(a) and (b).

Figure 16:
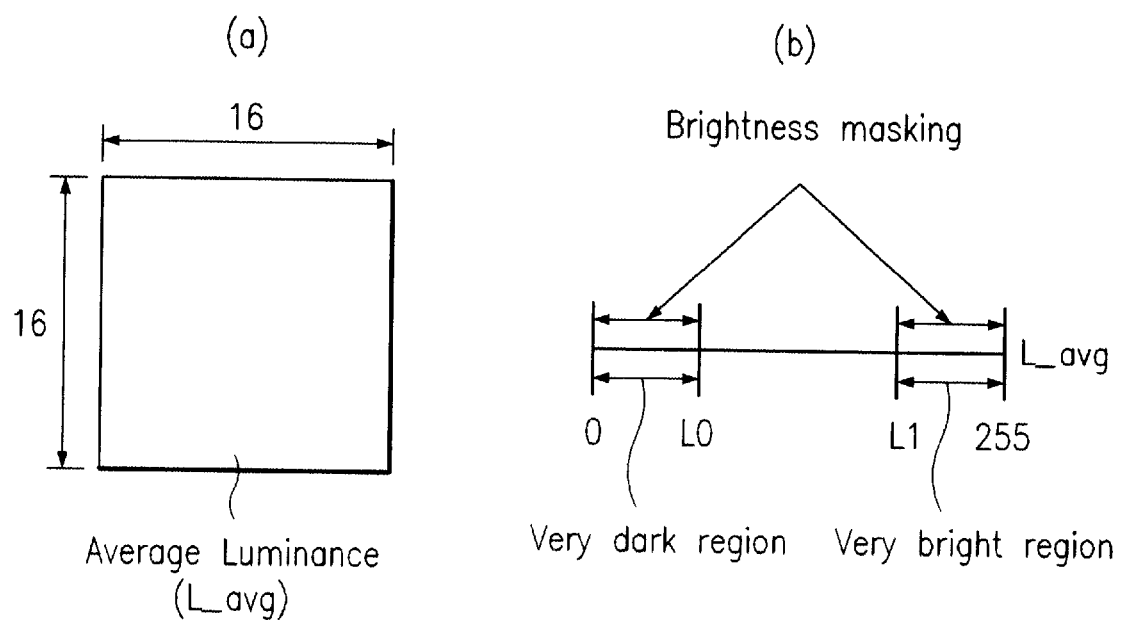
FIGS. 16(a) and (b) illustrate a method for finding macro blocks to use brightness masking according to the present invention.

The bits may further be saved utilizing the fact that the sight of human are sensitive and deteriorates for image quality in a very bright or dark place. A method for finding a macro block masked by brightness (BM), as shown in FIGS. 16(a) and (b), is based upon the average of luminance of every pixels in the current macro block. The macro block with an average luminance smaller than L0 or greater than L1 and is selected as an insensitive portion to the naked eyes and can be quantized coarsely. The values L0 and L1 are constants determined experimentally and in the preferred embodiment, L0 is 64 and L1 is 192.

For quantization of a selected macro block, the calculated value of mquant$_j$ would be doubled. The process may be summed up as follows and can be expressed by Equation 15 below.

1) Calculation of average luminance L_avg of the current macro block
2) Regulation of mquant$_j$ 2×mquant$_j$ if L_avg>L0 or L_avg<L1 mquant$_j$=mquant$_j$ otherwise [Equation 15]

Figure 17A:
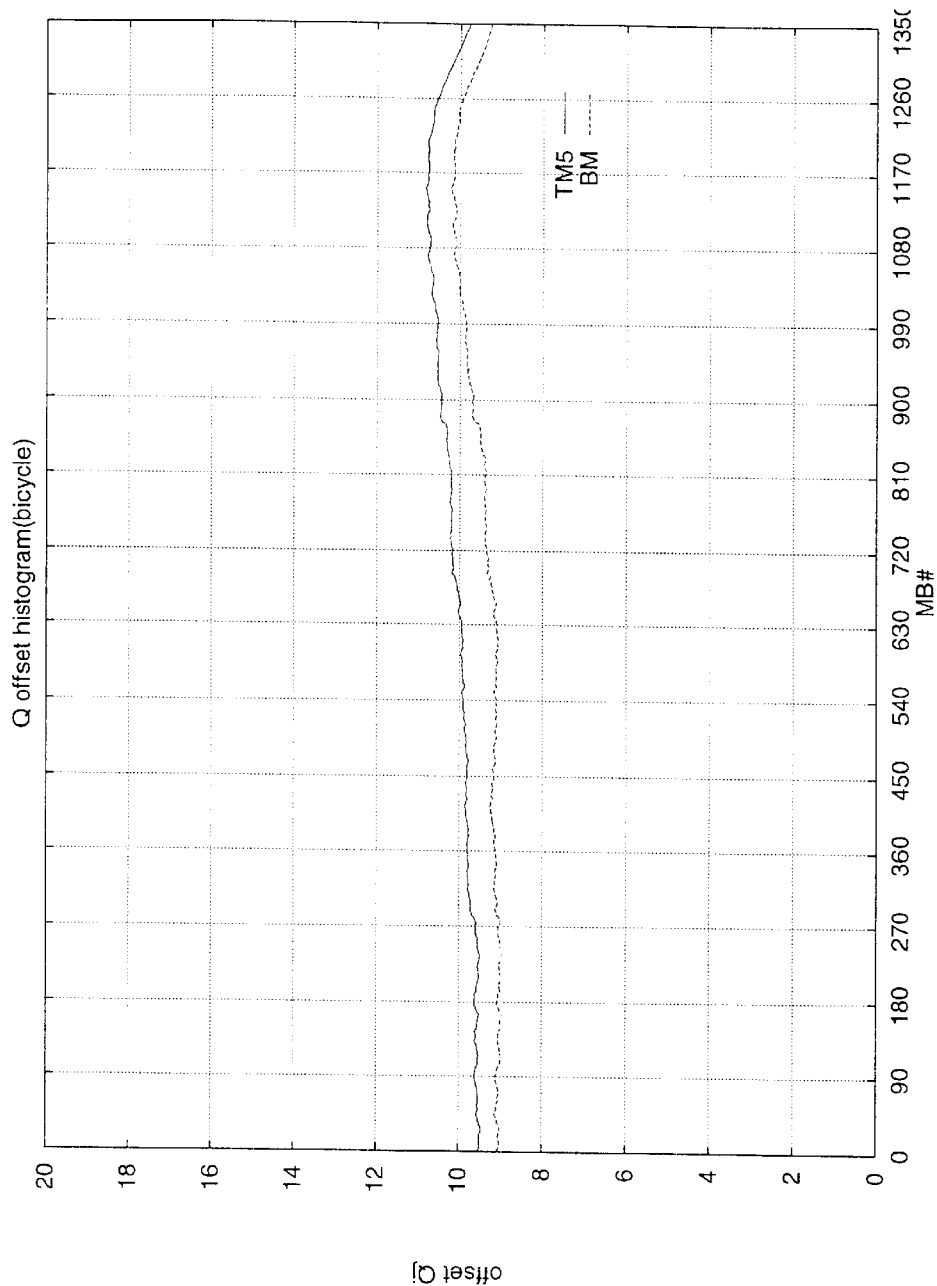
Figure 17B:
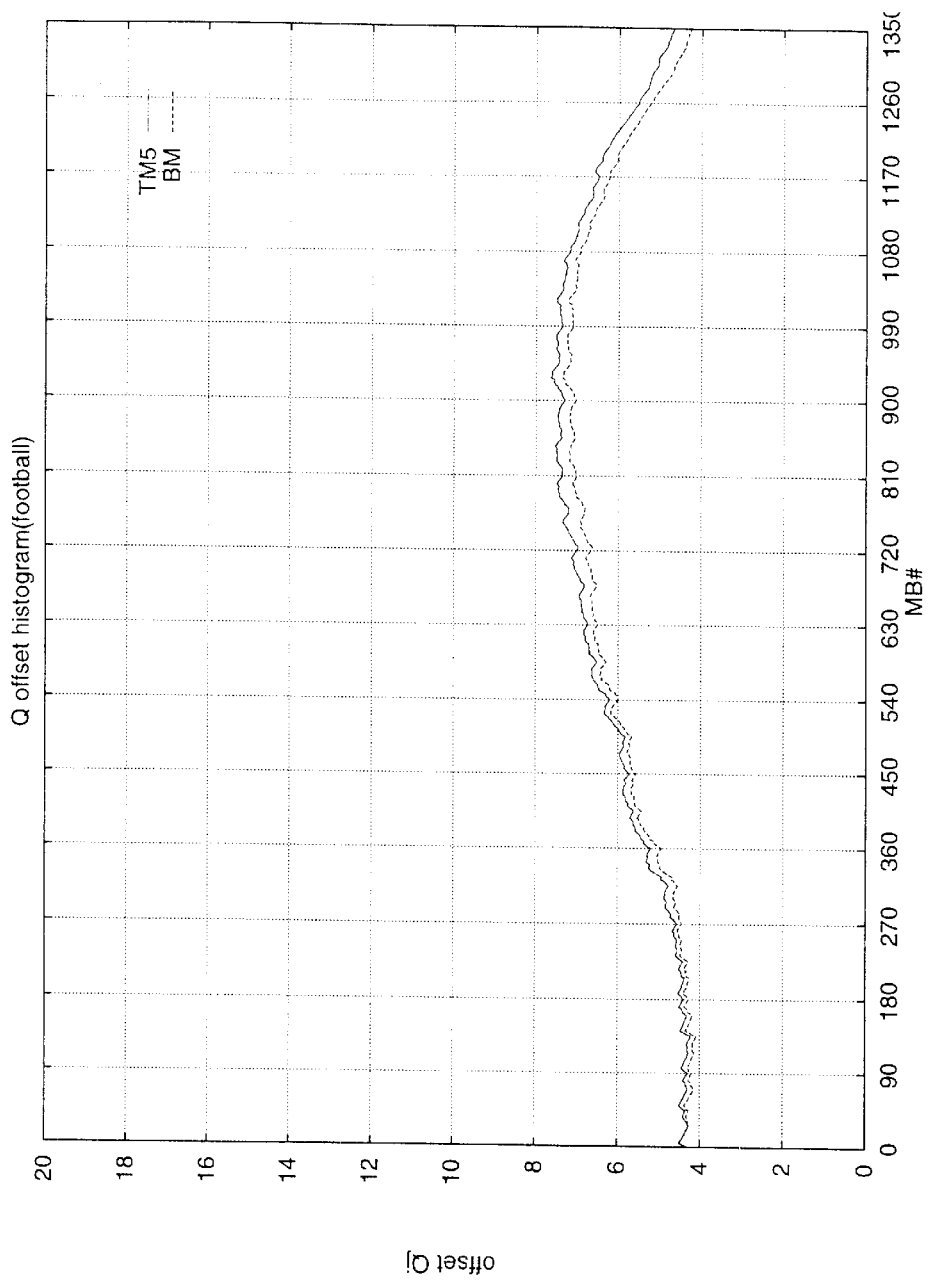

Bits are much saved for blocks having dark or bright areas and quantized finely for other areas, enhancing the subjective image quality. FIGS. 17(a)–(c) reveal that offset $Q_j$ according to accumulation in the buffer is lowered relative to TM5, thereby transferring the saved bits other areas uniformly.

Figure 18:
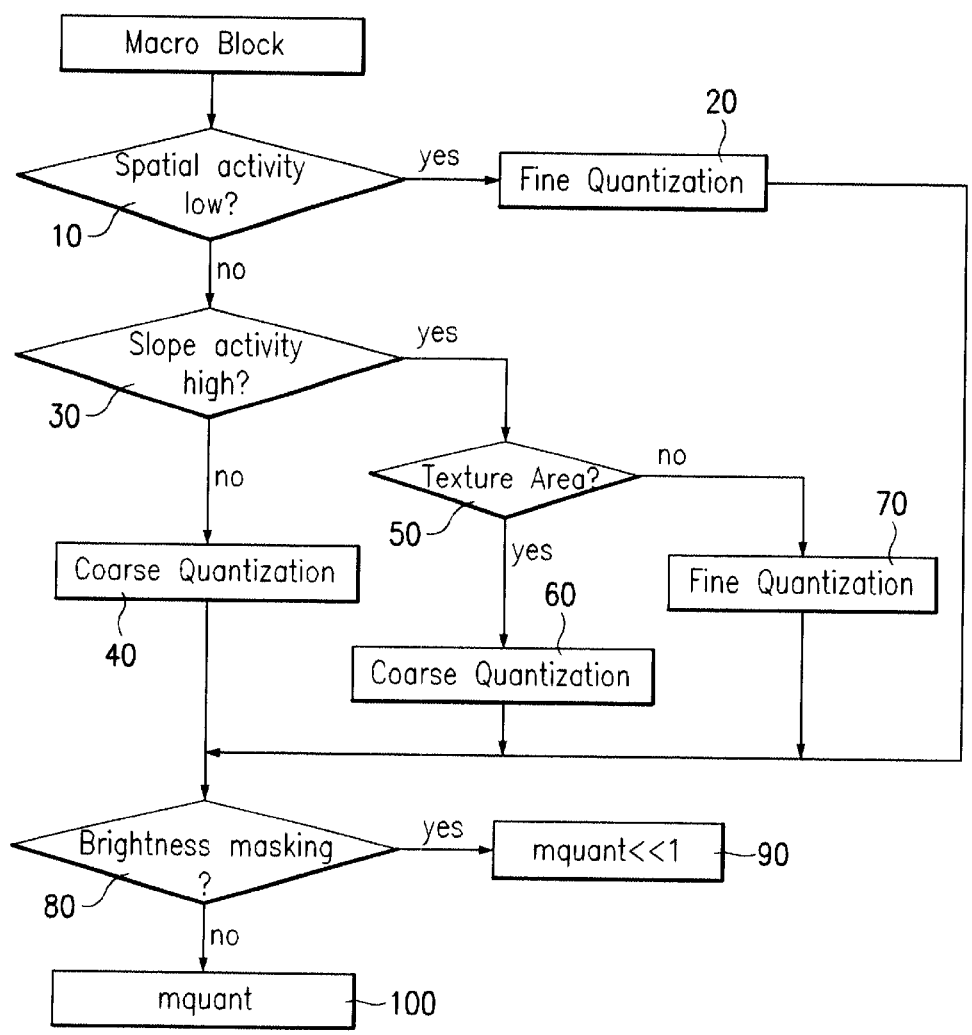
FIG. 18 is a flow chart illustrating the adaptive quantization control procedure according to the present invention.

FIG. 18 is flowchart of the combined method of the SA, TE and BM methods. For each macro block, ajudgement is made whether the spatial activity is high (step 10). Fine quantization is performed if the spatial activity is low (step 20), otherwise a judgement is made whether the slope activity is low (step 30). A coarse quantization is performed if the slope activity is high (step 40), otherwise ajudgement is made whether the macro block is a texture area (step 50). A coarse quantization is performed if the macro block is determined as a texture area (step 60), otherwise a fine quantization is performed (step 70). Afterwards, an additional judgement is made whether the macro block is masked by brightness (step 80). If the macro block is determined as a brightness masked block, mquant is adjusted (step 90), otherwise the mquant is used without adjustment (step 100).

According to the present invention, the SA method is used to mitigate blocking effect in the region with large motion, while a coarse quantization of texture areas having less blocking effect and the brightness masked area are implemented to reduce the buffer level, thereby enhancing the overall image quality.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for adaptive quantization control, comprising:
    obtaining a spatial activity of a data block;
    obtaining a slope activity of the data block;
    controlling the quantization of the data block utilizing the spatial activity if the level of spatial activity meets a first predetermined condition;
    controlling the quantization of the data block utilizing a combination of the spatial activity and the slope activity if the level of spatial activity meets a second predetermined condition; and
    controlling the quantization of the data block utilizing the slope activity if the level of spatial activity meets a third predetermined condition.

2. The method of claim 1, wherein in controlling the quantization:
    the data block is quantized utilizing the spatial activity if the level of spatial activity is below a first threshold value;
    the data block is quantized utilizing the slope activity if the level of spatial activity is greater than a second threshold value; and
    the data block is quantized utilizing a combination of the spatial activity and the slope activity if the level of spatial activity is between the first and the second threshold values.

3. The method of claim 1, wherein in controlling the quantization of the data block utilizing a combination of the spatial activity and the slope activity, more weight is given to the slope activity as the level of spatial activity increases.

4. The method of claim 1, wherein the spatial activity is obtained by comparing a level of complexity of a data block to the level of complexity in all data blocks.

5. The method of claim 1, wherein obtaining the slope activity comprises calculating the slope activity by a slope measure utilizing one of either a motion compensated data block or a residual data block.

6. The method of claim 1, further comprising:
    extracting texture areas for coarse quantization; and
    quantizing the extracted texture areas coarsely.

7. The method of claim 6, further comprising:
    determining a brightness masked data block;
    determining whether the luminance meets a fourth predetermined condition; and
    adjusting the quantization parameter if the data block satisfies the fourth predetermined condition.

8. The method of claim 1, further comprising:
    determining a brightness masked data block;
    determining whether the luminance meets a fourth predetermined condition; and
    adjusting the quantization parameter if the data block satisfies the fourth predetermined condition.

9. A method for adaptive quantization control, comprising:
    obtaining a spatial activity of a data block;
    obtaining a slope activity of the data block; and
    controlling the quantization of the data block utilizing a level of both the spatial activity and the slope activity, wherein
    the slope activity is obtained by calculating only the slopes formed between the data block and left-side and top-side macro blocks.

10. A method for adaptive quantization control, comprising:
    obtaining a spatial activity of a data block;
    obtaining a slope activity formed between the data block and a top macro block; and
    controlling the quantization of the data block utilizing a level of both the spatial activity and the slope activity, wherein the slope activity is obtained by:
    calculating a slope of a top field of the data block;
    calculating a slope of a bottom field of the data block; and
    selecting the larger one of either the top field slope or the bottom field slope as the slope formed between the data block and the top macro block.

11. A method for adaptive quantization control, comprising:
    obtaining a spatial activity of a data block;
    obtaining a slope activity of the data block;
    controlling the quantization of the data block utilizing a level of both the spatial activity and the slope activity;
    extracting texture areas for coarse quantization; and
    quantizing the extracted texture areas coarsely.

12. The method of claim 11, wherein extracting texture areas further comprises:
    defining subblocks in the data block;
    obtaining the distribution of slopes in the subblocks of the data block; and
    determining whether the data block is a texture area utilizing an average and a mutual difference of the slope distribution in the subblocks.

13. The method of claim 12, wherein in defining the subblock, the data block is divided into top and bottom fields.

14. The method of claim 13, wherein extracting the texture areas further comprises:
    determining whether a first predetermined condition is met in the top field;
    determining from a data block which satisfies the first predetermined condition whether a second predetermined condition is met in the bottom field; and
    extracting the data block as a texture area if the data block satisfies the second predetermined condition.

15. The method of claim 11, further comprising:
    determining a brightness masked data block;
    determining whether the luminance meets a predetermined condition; and
    adjusting the quantization parameter if the data block satisfies the predetermined condition.

16. The method of claim 15, further comprising:
    quantizing the data block finely if the level of spatial activity is low; and quantizing the data block coarsely if the level of spatial activity is high.

17. A method for adaptive quantization control, comprising:
obtaining a spatial activity of a data block;
obtaining a slope activity of the data block;
controlling the quantization of the data block utilizing a level of both the spatial activity and the slope activity;
determining a brightness masked data block;
determining whether the luminance meets a predetermined condition; and
adjusting the quantization parameter if the data block satisfies the predetermined condition.

18. The method of claim 17, wherein:
the luminance is calculated based upon an average of luminance of every pixel; and
in determining whether the luminance meets the predetermined condition, a determination is made whether the average luminance is smaller than a first threshold value or the average luminance is greater than a second threshold value.

19. The method of claim 17, further comprising:
quantizing the data block finely if the level of spatial activity is low; and
quantizing the data block coarsely if the level of spatial activity is high.

20. A method for adaptive quantization control, comprising:
obtaining a spatial activity of a data block;
obtaining a slope activity of the data block;
quantizing the data block finely if the level of spatial activity is low; and
quantizing the data block coarsely if the level of spatial activity is high.

21. A method for adaptive quantization control, comprising:
obtaining a spatial activity of a data block;
obtaining a slope activity of the data block;
quantizing the data block finely if the level of spatial activity is low; and
quantizing the data block coarsely if the level of spatial activity is high and the level of slope activity is low.

22. The method of claim 21, further comprising:
quantizing the data block coarsely when the level of spatial activity is high, the level of slope activity is high, and the data block is determined to be a texture area;
quantizing the data block finely when the level of spatial activity is high, the slope activity is high, and the data block is determined not to be a texture area; and
adjusting the quantization parameter if a luminance of the data block meets a predetermined condition.

23. A video encoder comprising:
an image memory storing the original image as macro blocks in units of field or frame;
a subtractor obtaining a residual signal between the original image and a motion compensated image;
a DCT section performing a discrete cosine transform of the residual signal;
a quantizer quantizing the DCT converted value utilizing quantization parameters;
a inverse quantizer inverse quantizing the quantized signal;
an IDCT performing inverse discrete cosine transforming the inverse quantized signal;
an adder adding the IDCT converted signal to a motion compensated signal from the motion E/C section, and storing the video data in the memory;
a memory storing video data;
a motion E/C section performing motion estimating and compensation of the data stored in the memory, and outputting the motion compensated image and the motion compensated signal;
an slope activity extractor extracting a slope activity of a macro block stored in the image memory;
a spatial activity extractor extracting a spatial activity of the macro block;
a controller controlling the quantization of the image block by adjusting the quantization parameters according to the slope activity and the spatial activity.

24. An apparatus of claim 23, wherein the spatial activity extractor further determines whether the macro block is a texture area for coarse quantization and wherein the controller adjusts the quantization parameters for coarse quantization if the macro block is determined to be a texture area.

25. An apparatus of claim 34, wherein the spatial activity extractor further determines whether a luminance of the image block stored in the image memory meets a predetermined condition and wherein the controller further adjusts the quantization parameters if the image block satisfies the predetermined condition.

26. The method of claim 23, wherein the controller:
controls the quantization of the image block utilizing the spatial activity if the level of spatial activity meets a first predetermined condition;
controls the quantization of the image block utilizing a combination of the spatial activity and the slope activity if the level of spatial activity meets a second predetermined condition; and
controls the quantization of the image block utilizing the slope activity if the level of spatial activity meets a third predetermined condition.

27. The method of claim 23, wherein the controller:
controls a fine quantization of the image block if the level of spatial activity is low; and
controls a coarse quantization of the image block if the level of spatial activity is high.

28. The method of claim 23, wherein the controller:
controls the quantization of the image block utilizing the spatial activity if the level of spatial activity is below a first threshold value;
controls the quantization of the image block utilizing the slope activity if the level of spatial activity is greater than a second threshold value; and
controls the quantization of the image block utilizing a combination of the spatial activity and the slope activity if the level of spatial activity is between the first and the second threshold values.

* * * * *